United States Patent [19]
Enomoto et al.

[11] Patent Number: 5,995,762
[45] Date of Patent: Nov. 30, 1999

[54] LENS DRIVING MECHANISM

[75] Inventors: Shigeo Enomoto, Tokyo; Shinji Tsukamoto, Saitama; Ken Hirunuma, Tokyo, all of Japan

[73] Assignee: Asahi Kogaku Kogyo Kabushiki Kaisha, Tokyo, Japan

[21] Appl. No.: 09/074,403

[22] Filed: May 8, 1998

[30] Foreign Application Priority Data

| May 20, 1997 | [JP] | Japan | 9-145768 |
| May 12, 1997 | [JP] | Japan | 9-137793 |
| May 14, 1997 | [JP] | Japan | 9-139201 |

[51] Int. Cl.$^6$ .......................... G03B 17/00; G02B 27/64
[52] U.S. Cl. ........................................ 396/55; 359/554
[58] Field of Search ........................ 396/55; 348/208; 359/554, 557

[56] References Cited

U.S. PATENT DOCUMENTS

| 4,996,545 | 2/1991 | Enomoto et al. | 396/53 |
| 5,266,988 | 11/1993 | Washisu | 396/55 |
| 5,583,597 | 12/1996 | Enomoto | 396/55 |
| 5,721,969 | 2/1998 | Arai | 396/55 |
| 5,835,799 | 11/1998 | Washisu | 396/55 |

FOREIGN PATENT DOCUMENTS

| 6-67246 | 3/1994 | Japan . |
| 10-20213 | 1/1998 | Japan . |
| 10-83007 | 3/1998 | Japan . |

*Primary Examiner*—W. B. Perkey
*Attorney, Agent, or Firm*—Greenblum & Bernstein, P.L.C.

[57] ABSTRACT

At least one lens is held by a lens holding plate. The lens holding plate is driven along two axes, crossing at right angles, which are perpendicular to an optical axis of the lens, by direct-drive-type actuators. The direct-drive-type actuators are respectively disposed in recessed portions which are formed in the lens holding plate, such that movable portions of the direct-drive-type actuators are in slidable contact with internal surfaces of the recessed portions.

30 Claims, 17 Drawing Sheets

LENS DRIVING MECHANISM

BACKGROUND OF THE INVENTION

1. Field of the Invention

The present invention relates to a mechanism for driving a lens.

2. Description of the Related Art

Conventionally, there is known an optical device, such as a still camera or binoculars, which is provided with a mechanism for correcting a trembling of a focused image. The mechanism for correcting the trembling includes correction lenses. The correction lenses are moved in predetermined directions on a plane perpendicular to an optical axis of the correction lenses, so that a movement of the other optical systems of the optical device is canceled, whereby the trembling of the focused image is corrected.

In order to correct the trembling precisely, the correction lenses should be driven in at least two directions perpendicular to each other, thus at least two driving mechanisms are necessary. Accordingly, control of the mechanisms is complicated and the structure of the optical device is large.

SUMMARY OF THE INVENTION

Therefore, an object of the present invention is to provide a simple and compact correction mechanism, which cancels the trembling of the focused image. Note that, in this specification, "lengthwise direction" means a vertical direction in a state when an optical device, which is provided with a correction mechanism according to the present invention, is normally used, and "lateral direction" means a direction which is perpendicular to the lengthwise direction.

In accordance with an aspect of the present invention, there is provided a lens driving mechanism comprising a holding member that holds at least one lens and a plurality of direct-drive-type actuators that drive the holding member in a plane perpendicular to an optical axis of the lens. Each of the plurality of direct-drive-type actuators includes a movable portion in direct contact with a surface portion of the holding member. The movable portion urges the holding member in a longitudinal direction of the movable portion. At least a part of each of the plurality of direct-drive-type actuators is disposed in a corresponding opening formed in the holding member. The corresponding opening is formed by removing a portion of the holding member.

The plurality of direct-drive-type actuators comprise a first direct-drive-type actuator and a second direct-drive-type actuator. A first movable portion of the first direct-drive-type actuator moves the holding member along a first axis parallel to the longitudinal direction of the first movable portion. A second movable portion of the second direct-drive-type actuator moves the holding member along a second axis parallel to the longitudinal direction of the second movable portion. The first axis is perpendicular to the second axis.

The corresponding opening may include a first recess and a second recess that comprise a first external surface, having a first surface portion, perpendicular to the plane, a second external surface perpendicularly contiguous to the first external surface, and a third external surface, having a second surface portion, perpendicularly contiguous to the second external surface. The first direct-drive-type actuator is disposed in the first recess and the second direct-drive-type actuator is disposed in the second recess.

At least one lens comprises a correction lens included in a telephoto optical system that corrects a tremble of a focused image.

A projecting end-face of the first movable portion of the first direct-drive-type actuator slidably contacts at least one of the first surface portion and the second surface portion of the first recess, and a projecting end-face of the second movable portion of the second direct-drive-type actuator slidably contacts at least one of the first surface portion and the second surface portion of the second recess.

The lens driving mechanism further comprises an urging member that urges the holding member such that the projecting end-face of the first movable portion of the first direct-drive-type actuator slidably contacts the first surface portion of the first recess, and the projecting end-face of the second movable portion of the second direct-drive-type actuator slidably contacts the first surface portion of the second recess. The urging member is a coil spring.

The corresponding opening may comprise a through-hole that includes a first internal surface having a first surface portion and a second internal surface having a second surface portion, which are perpendicular to the first axis, a third internal surface having a third surface portion and a fourth internal surface having a fourth surface portion, which are perpendicular to the second axis. The first direct-drive-type actuator and the second direct-drive-type actuator are disposed in the through-hole.

At least one lens comprises a correction lens included in a telephoto optical system that corrects a tremble of a focused image. The correction lens and another correction lens, operating in association with each other, are unitarily held by the holding member in binoculars.

The through-hole is formed between the correction lens and the other correction lens.

When the holding member is in a standard position, a center of mass of the first direct-drive-type actuator and a center of mass of the second direct-drive-type actuator lie on an axis parallel to an optical axis of the correction lens.

A projecting end-face of the first movable portion of the first direct-drive-type actuator slidably contacts at least one of the first surface portion and the second surface portion, and a projecting end-face of the second movable portion of the second direct-drive-type actuator slidably contacts at least one of the third surface portion and the fourth surface portion.

The lens driving mechanism further comprises an urging member that urges the holding member such that the projecting end-face of the first movable portion of the first direct-drive-type actuator slidably contacts the first surface portion, and the projecting end-face of the second movable portion of the second direct-drive-type actuator slidably contacts the third surface portion.

In accordance with another aspect of the present invention, there is provided a lens driving mechanism comprising: a holding member that holds at least one lens; and a plurality of direct-drive-type actuators that drive the holding member in a plane perpendicular to an optical axis of the lens. Each of the plurality of direct-drive-type actuators includes a movable portion in direct contact with a surface portion of the holding member. The movable portion urges the holding member in a longitudinal direction of the movable portion. A part of the holding member corresponding to one of the plurality of direct-drive-type actuators is defined by a first surface in the longitudinal direction and second surfaces contiguous to the first surface. At least one of the second surfaces is in slidable contact with a projecting end-face of the movable portion.

In accordance with another aspect of the present invention, there is provided a lens driving mechanism comprising: a holding member that holds at least one lens; a first driving member that moves the holding member along a first axis in a plane perpendicular to an optical axis of at least one lens; and a second driving member that moves the holding member along a second axis perpendicular to the first axis in the plane. The first driving member and the second driving member are arranged along an axis parallel to the optical axis of at least one lens.

The holding member is provide with a casing, in which a first yoke is disposed. The first driving member and the second driving member are disposed such that the casing lies between the first driving member and the second driving member. A through-hole is formed in the casing. The first yoke is disposed in the through-hole.

The first driving member includes a first coil, a first magnet, a second magnet, the first yoke, and a second yoke; and the second driving member includes a second coil, a third magnet, a fourth magnet, the first yoke, and a third yoke. The first coil and the second coil are provided on the holding member.

The first coil is disposed on the holding member adjacent to a first surface of the first yoke. The first magnet and the second magnet are disposed on a first surface of the second yoke. The first yoke is parallel to the second yoke. The second coil is disposed on the holding member adjacent to a second surface of the first yoke. The third magnet and the fourth magnet are disposed on a first surface of the third yoke. The first yoke is parallel to the third yoke.

The holding member is a plate disposed in a same plane as the first yoke. The first yoke is disposed between the first coil and the second coil. The first coil and the second coil are flat coils. Leading wires of the flat coils are rotated around the axis parallel to the optical axis, and a width of the flat coil, along the axis is less than a diameter of the flat coils along a plane perpendicular to the parallel axis.

The first magnet and the second magnet are disposed between the first coil and the second yoke, and the third magnet and the fourth magnet are disposed between the second coil and the third yoke.

The first magnet and the second magnet are plate magnets, longitudinal directions of the plate magnets cross the first axis at right angles. The third magnet and the fourth magnet are plate magnets, longitudinal directions of the plate magnets cross the second axis at right angles.

The holding member holds a pair of the at least one lens. The first driving member and the second driving member are disposed between the pair of at least one lens. The at least one lens is a correction lens correcting a trembling of a focused image.

In accordance with another aspect of the present invention, there is provided a lens driving mechanism comprising: a holding member that holds at least one lens, in a portion of a plane portion perpendicular to an optical axis of at least one lens; a first driving mechanism that moves the holding member along a first axis perpendicular to the optical axis; and a second driving mechanism that moves the holding member along a second axis perpendicular to the first axis. The first driving mechanism and the second driving mechanism are disposed symmetrically about the plane perpendicular to the optical axis. The lens driving mechanism further comprises a pedestal plate, provided on the holding member, that projects along the plane perpendicular to the optical axis, and includes an opening. The first driving mechanism comprises: a first yoke disposed in the opening; a first coil formed on a first plane of the pedestal plate which is perpendicular to the optical axis; a first magnet facing the first coil, and a second yoke supporting the first magnet. The second driving mechanism comprises: the first yoke; a second coil formed on a second plane of the pedestal plate which is perpendicular to the optical axis and parallel to the first plane of the pedestal plate; a second magnet facing the second coil, and a third yoke supporting the second magnet. At least one lens is a correction lens correcting a trembling of a focused image.

BRIEF DESCRIPTION OF THE DRAWINGS

The present invention will be better understood from the description of the preferred embodiments of the invention set forth below, together with the accompanying drawings, in which.

DESCRIPTION OF THE PREFERRED EMBODIMENTS

Figure 1:
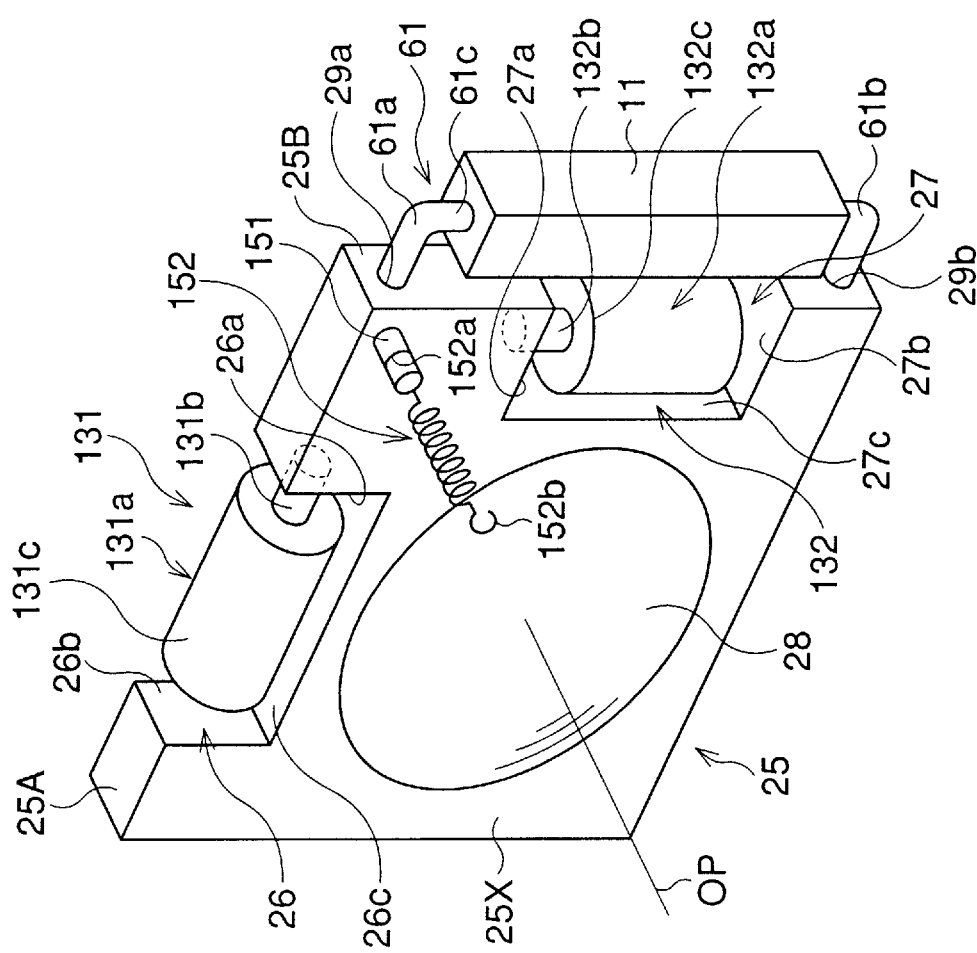
FIG. 1 is a perspective view of a mechanism for correcting a trembling of a focused image, to which a first embodiment, according to the present invention, is applied.

The present invention will now be described with reference to embodiments shown in the drawings.

Figure 2:
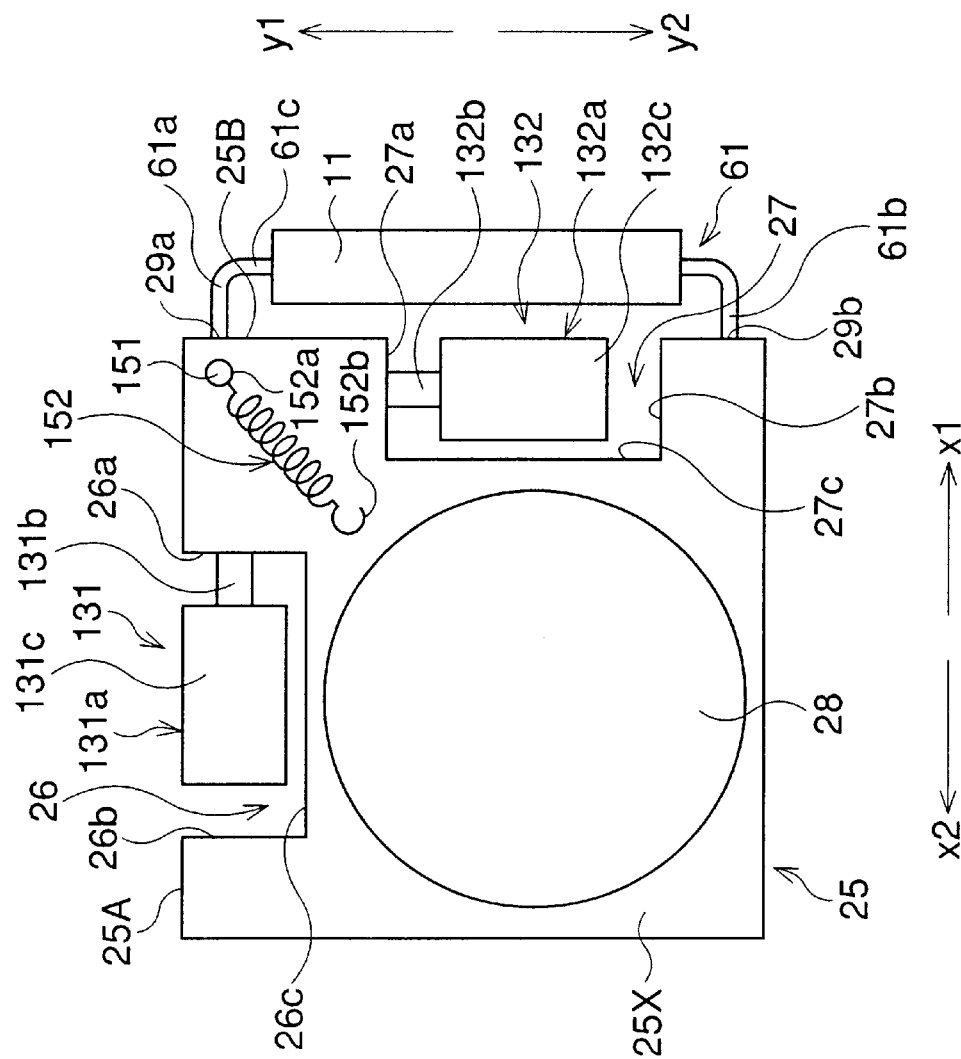
FIG. 2 is a front view of the first embodiment shown in FIG. 1.

FIG. 1 is a perspective view showing a mechanism for correcting a tremble of a focused image, to which a first embodiment, according to the present invention, is applied, and FIG. 2 is a front view of the first embodiment.

A correction lens 28 is held by a lens holding frame, generally indicated by reference 25. The lens holding frame 25 is a plate including a plane surface 25X, perpendicular to an optical axis OP of the correction lens 28. A configuration of the lens holding frame 25, taken along a plane parallel to the plane surface 25X, is generally rectangular. An upper side surface 25A of the lens holding frame 25 is perpendicular to the plane surface 25X, and is parallel to a plane, proceeding in the lateral direction, in which the optical axis OP lies. A right side surface 25B of the lens holding frame 25 is perpendicular to the plane surface 25X, and is parallel to a plane, proceeding in the lengthwise direction, in which the optical axis OP lies. The upper side surface 25A and the right side surface 25B are perpendicularly contiguous.

A recess portion 26 is formed in the upper side of the lens holding frame 25. The recess portion 26 is defined by an external surface 26c parallel to the upper side surface 25A, an external surface 26a perpendicular to the surface 26c, and an external surface 26b perpendicular to the surface 26c and facing the external surface 26a. A recess portion 27 is formed in the right side of the lens holding frame 25. The recess portion 27 is defined by an external surface 27c parallel to the right side surface 25B, an external surface 27a perpendicular to the surface 27c, and an external surface 27b perpendicular to the surface 27c and facing the external surface 27a.

Note that in an optical device to which the first embodiment is applied, a luminance flux, having passed through an objective lens, passes through the correction lens 28, and is directed to an eyepiece through an optical inversion system, such as a roof prism or Porro prism. Namely, the lens holding frame 25 is mounted in the optical device in such a manner that the correction lens 28 is disposed between the objective lens and the optical inversion system. Further, in this specification, "standard position" means a position in which the optical axis of the correction lens 28 is coaxial with the optical axis of the other optical systems of the optical device.

A first direct-drive-type actuator, generally indicated by reference 131, is provided in the recess portion 26. The first direct-drive-type actuator 131 comprises a stepping motor 131a and a shaft 131b (movable portion). The stepping motor 131a comprises a motor case 131c and a rotor (omitted in FIGS. 1 and 2) mounted in the motor case 131c. The rotor can be rotated clockwise and counterclockwise around an axis extending in the lateral direction.

The shaft 131b is supported so as to be movable in the longitudinal direction thereof, and is rotatable in accordance with the rotational operation of the rotor. Threads (omitted in FIGS. 1 and 2) are formed on the outer surface of the shaft 131b, and the shaft 131b is engaged with a female thread (omitted in FIGS. 1 and 2) formed on the inner surface of a quill of the motor case 131c. Namely, the shaft 131b rotatably extends or retracts in the longitudinal direction, in accordance with the rotational direction of the rotor.

The tip (projecting end-face) of the shaft 131b is in slidable contact with the surface 26a. The motor case 131c is secured to an inner surface (omitted in FIGS. 1 and 2) of an outer frame of the optical device. Further, the first direct-drive-type actuator 131 is disposed in a space which is defined by the recess portion 26, a plane including the plane surface 25X, and a plane including a plane surface of the lens holding frame 25, being opposite to the plane surface 25X.

A second direct-drive-type actuator, generally indicated by reference 132, is provided in the recess portion 27. The second direct-drive-type actuator 132 comprises a stepping motor 132a and a shaft 132b (movable portion), similar to the first direct-drive-type actuator 131. A rotor (omitted in FIGS. 1 and 2) mounted in a motor case 132c of the stepping motor 132a, can be rotated clockwise and counterclockwise around an axis extending in the lengthwise direction. The motor case 132c is secured to the inner surface of the outer frame of the optical device. The tip (projecting end-face) of the shaft 132b is in slidable contact with the surface 27a. The second direct-drive-type actuator 132 is disposed in a space which is defined by the recess portion 27, the plane including the plane surface 25X, and the plane including the plane surface of the lens holding frame 25, being opposite to the plane surface 25X.

As described above, in the first embodiment, the first direct-drive-type actuator 131 is disposed in the space which is defined by the recess portion 26, the plane including the plane surface 25X, and the plane including the plane surface opposite to the plane surface 25X, however the diameter of the motor case 131c in the optical axis OP direction may be greater than the thickness of the lens holding frame 25 in the optical axis OP direction. Similarly, the diameter of the motor case 132c in the optical axis OP direction may be greater than the thickness of the lens holding frame 25 in the optical axis OP direction.

A hole 29a and a hole 29b, which have a predetermined depth, are provided at the top and bottom, respectively, of the right side surface 25B. A central axis of the holes 29a and 29b is parallel to the upper side surface 25A. A guide bar 61 comprises lateral-direction guide portions 61a and 61b, which are parallel to each other, and a lengthwise-direction guide portion 61c, which connects the lateral-direction guide portions 61a and 61b. The length of the lengthwise-direction guide portion 61c, along its central axis, approximately equals a distance between the holes 29a and 29b. The lateral-direction guide portion 61a is slidably received by the hole 29a, and the lateral-direction guide portion 61b is slidably received by the hole 29b.

The lengthwise-direction guide portion 61c is supported by a projecting portion 11, formed on the inner surface of the outer frame of the optical device, so as to be slidable in a longitudinal direction along the central axis thereof.

As described above, with respect to the lateral direction, the lens holding frame 25 is moved while being guided by the lateral-direction guide portions 61a and 61b, and with respect to the lengthwise direction, the lens holding frame 25 is moved in accordance with the guide bar 61, being directed by the projecting portion 11.

A pin 151 is provided on the plane surface 25X, at a portion adjacent to a corner at which the upper side surface 25A and the right side surface 25B meet. One end 152a of a coil spring 152 is attached to the pin 151, and another end 152b of the coil spring 152 is engaged with a projecting portion (omitted in FIG. 1) of the inner surface of the optical device, so that the lens holding frame 25 is urged in a direction towards the optical axis OP, at a declination of 45 degrees from the lateral direction when in the standard position, in a plane perpendicular to the optical axis OP.

Accordingly, the lens holding frame 25 is resiliently biased in such a manner that the tip of the shaft 131b of the first direct-drive-type actuator 131 is in slidable contact with the external surface 26a of the recess portion 26 at all times, and the tip of the shaft 132b of the second direct-drive-type actuator 132 is in slidable contact with the external surface 27a of the recess portion 27 at all times, whereby the pressure exerted by the tip of the shaft 131b on the surface 26a and the pressure exerted by the tip of the shaft 132b on the surface 27a are substantially equal.

When the rotor of the stepping motor 131a of the first direct-drive-type actuator 131 is rotated clockwise, the shaft 131b extends in the direction x1 (see FIG. 2), so that the lens holding frame 25 is moved in the direction x1. When the rotor of the stepping motor 131a is rotated counterclockwise, the shaft 131b retracts in the direction x2 (see FIG. 2), so that the lens holding frame 25 is moved in the direction x2 due to the urging force of the coil spring 152.

When the rotor of the stepping motor 132a of the second direct-drive-type actuator 132 is rotated clockwise, the shaft 132b extends in the direction y1 (see FIG. 2), so that the lens holding frame 25 is moved in the direction y1. When the rotor of the stepping motor 132a is rotated counterclockwise, the shaft 132b retracts in the direction y2 (see FIG. 2), so that the lens holding frame 25 is moved in the direction y2 due to the urging force of the coil spring 152.

The first direct-drive-type actuator 131 and the second direct-drive-type actuator 132 are disposed in the recess portions 26 and 27, respectively, such that, during operation, the motor case 131d and the motor case 132d do not contact the lens holding member 25.

Figure 3:
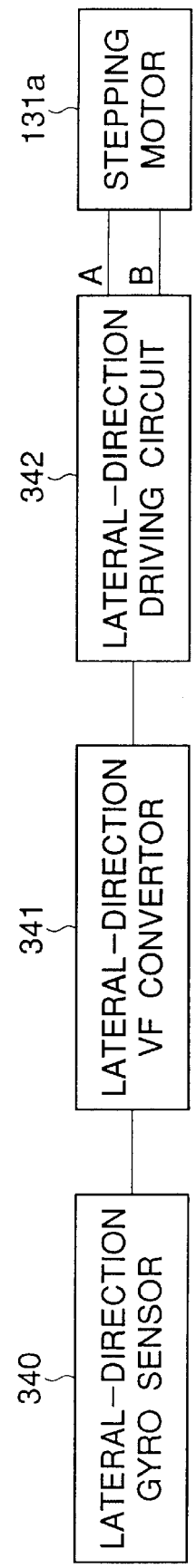
FIG. 3 is a block diagram of the first embodiment.

FIG. 3 is a block diagram of the first embodiment, indicating a correction lens driving circuit which corrects a movement of the optical axis of the optical device in the lateral direction. A lateral-direction driving circuit 342 is connected to the stepping motor 131a of the first direct-drive-type actuator 131, a lateral-direction VF (Voltage-Frequency) convertor 341 is connected to the lateral-direction driving circuit 342, and a lateral-direction gyro sensor 340 is connected to the lateral-direction VF convertor 341. Similarly, in a correction lens driving circuit (not shown), which corrects a movement of the optical axis of the optical device in the lengthwise direction, a lengthwise-direction driving circuit is connected to the stepping motor 132a of the second direct-drive-type actuator 132, a lengthwise-direction VF convertor is connected to the lengthwise-direction driving circuit, and a lengthwise-direction gyro sensor is connected to the lengthwise-direction VF convertor.

The lateral-direction gyro sensor 340 detects the direction and angular speed of the movement of the optical device from the standard position occurring due to hand tremble, with respect to the lateral direction. In the lateral-direction VF convertor 341, the angular speed is multiplied by a predetermined compensation coefficient to transform the frequency of the angular speed, so that a frequency signal is outputted from the lateral-direction VF convertor 341. Note that the compensation coefficient is determined based on the combined image magnification of the optical systems, including the correction lens, of the optical device. The frequency signal, which is inputted to the lateral-direction driving circuit 342, is converted to a two-phase pulse signal. As described above, the stepping motor 131a is connected to the lateral-direction driving circuit 342, so that the stepping motor 131a is driven by the two-phase pulse signal outputted from the lateral-direction driving circuit 342. Further, the voltage signal corresponding to the movement direction of the optical device, detected by and outputted from the lateral-direction gyro sensor 340, is inputted to the stepping motor 131a through the lateral-direction VF convertor 341 and the lateral-direction driving circuit 342.

Figure 4:
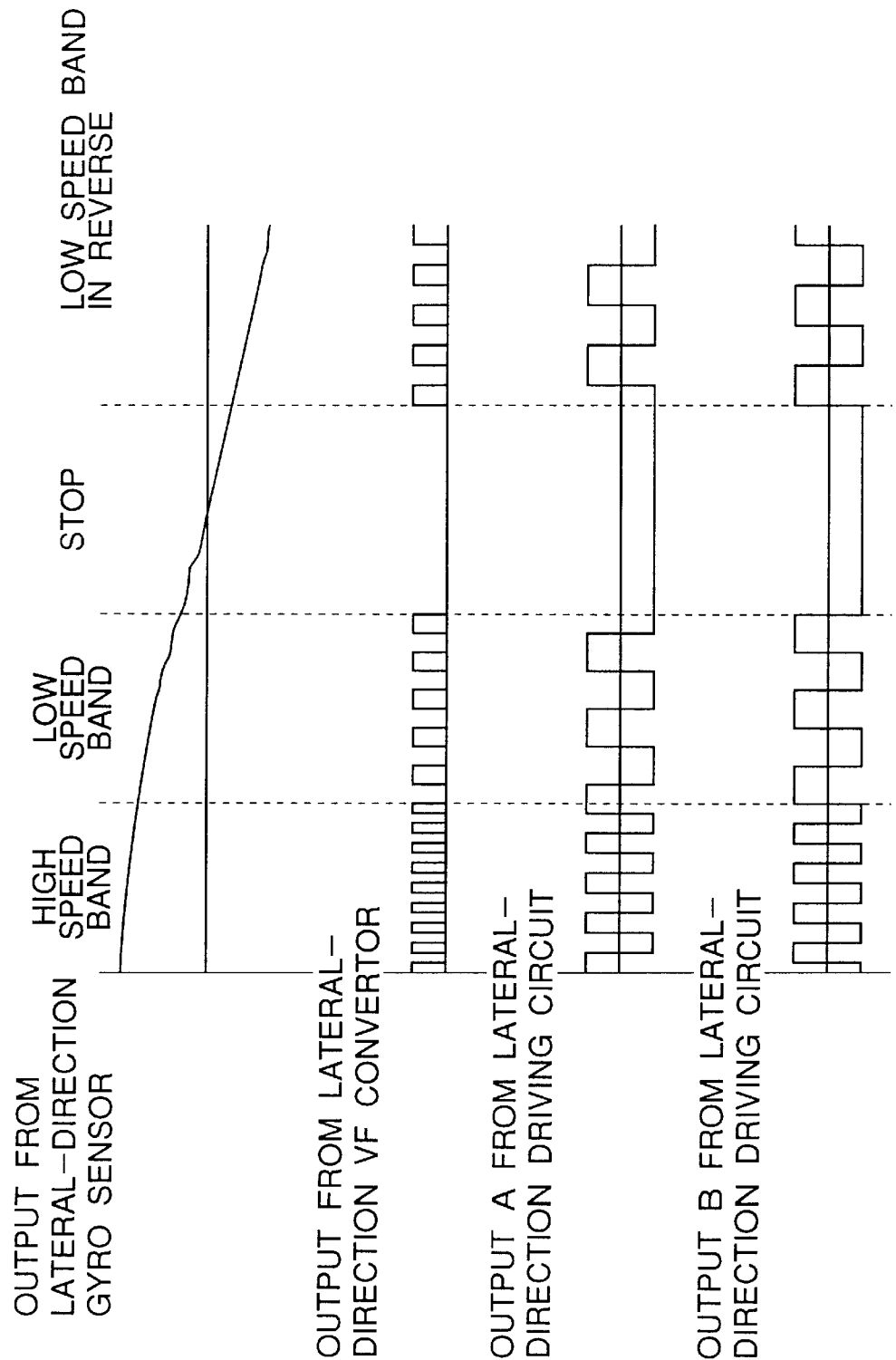
FIG. 4 is a graph showing waveforms of signals outputted from each device included in the mechanism of the first embodiment.

FIG. 4 is a graph showing waveforms of signals outputted from the lateral-direction gyro sensor 340, the lateral-direction VF convertor 341 and the lateral-direction driving circuit 342, of the first embodiment. When the hand tremble is strong, the angular speed of the movement of the optical device is high, and the voltage signal from the lateral-direction gyro sensor 340 is high. Accordingly, the pulse frequency of the signal outputted from the lateral-direction VF convertor 341 is high. On the other hand, when the hand tremble is weak, the angular speed of the movement of the optical device is low, and the voltage signal from the lateral-direction gyro sensor 340 is low. Accordingly, the pulse frequency of the signal outputted from the lateral-direction VF convertor 341 is low. Thus, a two-phase pulse signal, having a pulse width variable in accordance with the pulse frequency of the signal outputted from the lateral-direction VF convertor 341, is outputted from the lateral-direction driving circuit 342.

Further, the rotational direction, clockwise and counterclockwise, of the rotor of the stepping motor 131a is changed in accordance with the difference between phases of the two-phase pulse signal. The lateral-direction driving circuit 342 outputs the two-phase pulse signal, which causes the rotor to rotate, so that the lens holding frame 25 can be moved via the shaft 131b in the direction by which the tremble of the focused image is canceled.

Namely, when the lateral-direction gyro sensor 340 detects the movement of the optical device in the direction x2, the lateral-direction driving circuit 342 outputs the two-phase pulse signal, having a pulse width corresponding to the speed of the tremble of the image, which causes the rotor to rotate clockwise at a comparable rate. Due to the clockwise rotation of the rotor, the lens holding frame 25 is moved in the direction x1 at a speed which cancels the speed of the tremble of the image, as described above.

On the other hand, when the lateral-direction gyro sensor 340 detects the movement of the optical device in the direction x1, the lateral-direction driving circuit 342 outputs the two-phase pulse signal, having a pulse width corresponding to the speed of the tremble of the image, which causes the rotor to rotate counterclockwise at a comparable rate. Due to the counterclockwise rotation of the rotor, the lens holding frame 25 is moved in the direction x2 at a speed which cancels the speed of the tremble of the image, as described above.

Namely, when the gyro sensors detect the direction and the rotational speed of the movement of the optical device, the lens holding frame 25 is moved in the direction and at the speed by which the movement of the optical device is canceled, on the plane perpendicular to the optical axis OP, by the first direct-drive-type actuator 131 and the second direct-drive-type actuator 132.

Figure 5:
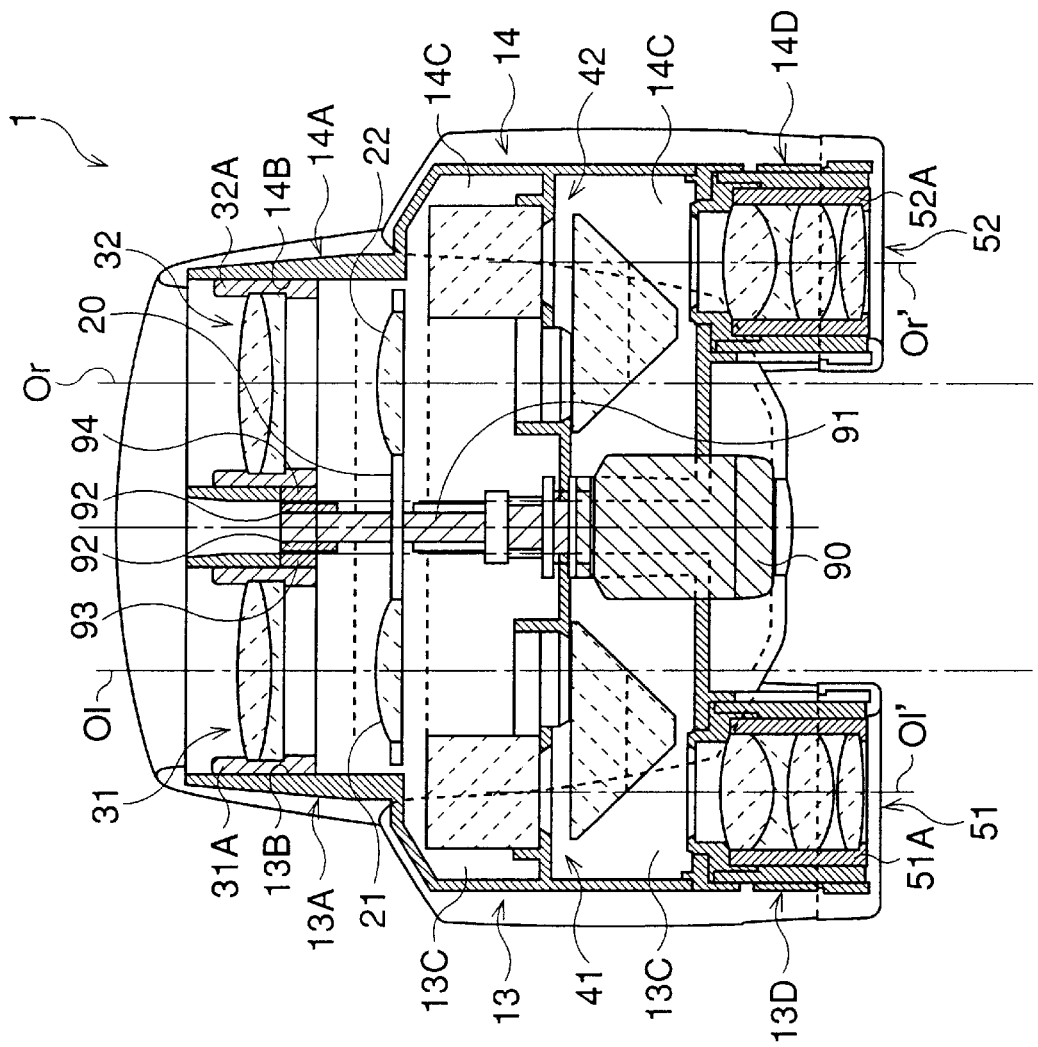
FIG. 5 is a sectional view of binoculars incorporating a second embodiment.

FIG. 5 is a sectional view of binoculars 1 incorporating a second embodiment, according to the present invention.

A luminance flux passes a pair of objective lenses 31 and 32, and is directed to a pair of optical inversion systems 41 and 42, through a pair of correction lenses 21 and 22. Each of the optical inversion systems 41, 42 is a Porro prism, comprising two right-angle prisms, which inverts an image thereby producing an erected image. The luminance flux is directed to a pair of eyepieces 51 and 52, after passing through the pair of optical inversion systems 41, 42. Namely, a left telephoto optical system (a first telephoto optical system) comprises the correction lens 21, the objective lens 31, the optical inversion system 41, and the eyepiece 51; and a right telephoto optical system (a second telephoto optical system) comprises the correction lens 22, the objective lens 32, the optical inversion system 42, and the eyepiece 52. Ol is the optical axis of the objective lens 31, Or is the optical axis of the objective lens 32, Ol' is the optical axis of the eyepiece 51, and Or' is the optical axis of the eyepiece 52.

The objective lens 31 is held by an objective lens barrel 31A, and the objective lens 32 is held by an objective lens barrel 32A. The objective lens barrel 31A is supported by an inner surface of a hole 13B provided on an objective lens barrel supporting portion 13A of a left case 13, in such a manner that the objective lens barrel 31A can be moved along the optical axis Ol. Similarly, the objective lens barrel 32A is supported by an inner surface of a hole 14B provided on an objective lens barrel supporting portion 14A of a right case 14, in such a manner that the objective lens barrel 32A can be moved along the optical axis Or.

The eyepiece 51 is held by an eyepiece barrel 51A, and the eyepiece 52 is held by an eyepiece barrel 52A. The eyepiece barrel 51A is securely mounted in an eyepiece barrel supporting portion 13D of the left case 13, and the eyepiece barrel 52A is securely mounted in an eyepiece barrel supporting portion 14D of the right case 14. The Porro prism of the optical inversion system 41 is placed in a prism room 13C, provided between the objective lens barrel supporting portion 13A and the eyepiece barrel supporting portion 13D, in the left case 13. Similarly, the Porro prism of the optical inversion system 42 is placed in a prism room 14C, provided between the objective lens barrel supporting portion 14A and the eyepiece barrel supporting portion 14D, in the right case 14.

One engaging member (not shown), which faces the prism room 14C, is provided on the outer surface of the prism room 13C, and another engaging member (not shown), which faces the prism room 13C, is provided on the outer surface of the prism room 14C, whereby the prism room 13C and the prism room 14C are engaged with each other.

A rotation ring 90 is provided between the eyepiece barrel 51A and the eyepiece barrel 52A. A rotation ring axle 91 is fixed to the rotation ring 90, along the central axis of the rotation ring 90. A lift axle 92 is threadingly engaged with the rotation ring axle 91. The lift axle 92 is connected to the objective lens barrel 31A by a left arm 93, and is connected to the objective lens barrel 32A by a right arm 94.

When the rotation ring 90 is rotated, rotational movement is transmitted to the lift axle 92 via the rotation ring axle 91, so that the lift axle 92 moves along the optical axes Ol and Or. Namely, the rotational movement of the rotation ring 90 is converted to the longitudinal movement of the lift axle 92, in the direction of the optical axes Ol and Or. In the left telephoto optical system, the movement of the lift axle 92 is transmitted to the objective lens barrel 31A by the left arm 93. Similarly, in the right telephoto optical system, the movement of the lift axle 92 is transmitted to the objective lens barrel 32A by the right arm 94. Accordingly, the objective lens barrels 31A and 32A are moved uniformly and simultaneously, in accordance with the movement of the lift axle 92, in the direction of the optical axes Ol and Or.

Namely, the rotation ring 90, the rotation ring axle 91, the lift axle 92, the left and right arms 93 and 94, and the objective lens barrels 31A and 32A, constitute an integrated focusing unit. The synchronized movement of the objective lens barrels 31A and 32A, along the respective optical axes Ol and Or, is initiated by rotating the rotation ring 90. Accordingly, a focusing operation can be performed by rotating the rotation ring 90 clockwise or counterclockwise by a predetermined amount.

Further, the left case 13 is rotatable around the optical axis Ol of the objective lens 31 and the right case 14 is rotatable around the optical axis Or of the objective lens 32, in accordance with the alternation of engaging position of the engaging members, with respect to each of the prism rooms 13C and 14C of the left case 13 and the right case 14. The rotation of the left case 13 and the right case 14 is synchronized and independent of the integrated focusing unit. The left case 13 and the right case 14 are engaged with the facing engaging members located on the outer surfaces of the prism rooms 13C and 14C. Accordingly, when the left case 13 is rotated clockwise around the optical axis Ol, the right case 14 rotates counterclockwise around the optical axis Or, and when the left case 13 is rotated counterclockwise around the optical axis Ol, the right case 14 rotates clockwise around the optical axis Or, so that an interpupillary distance is adjusted.

Figure 6:
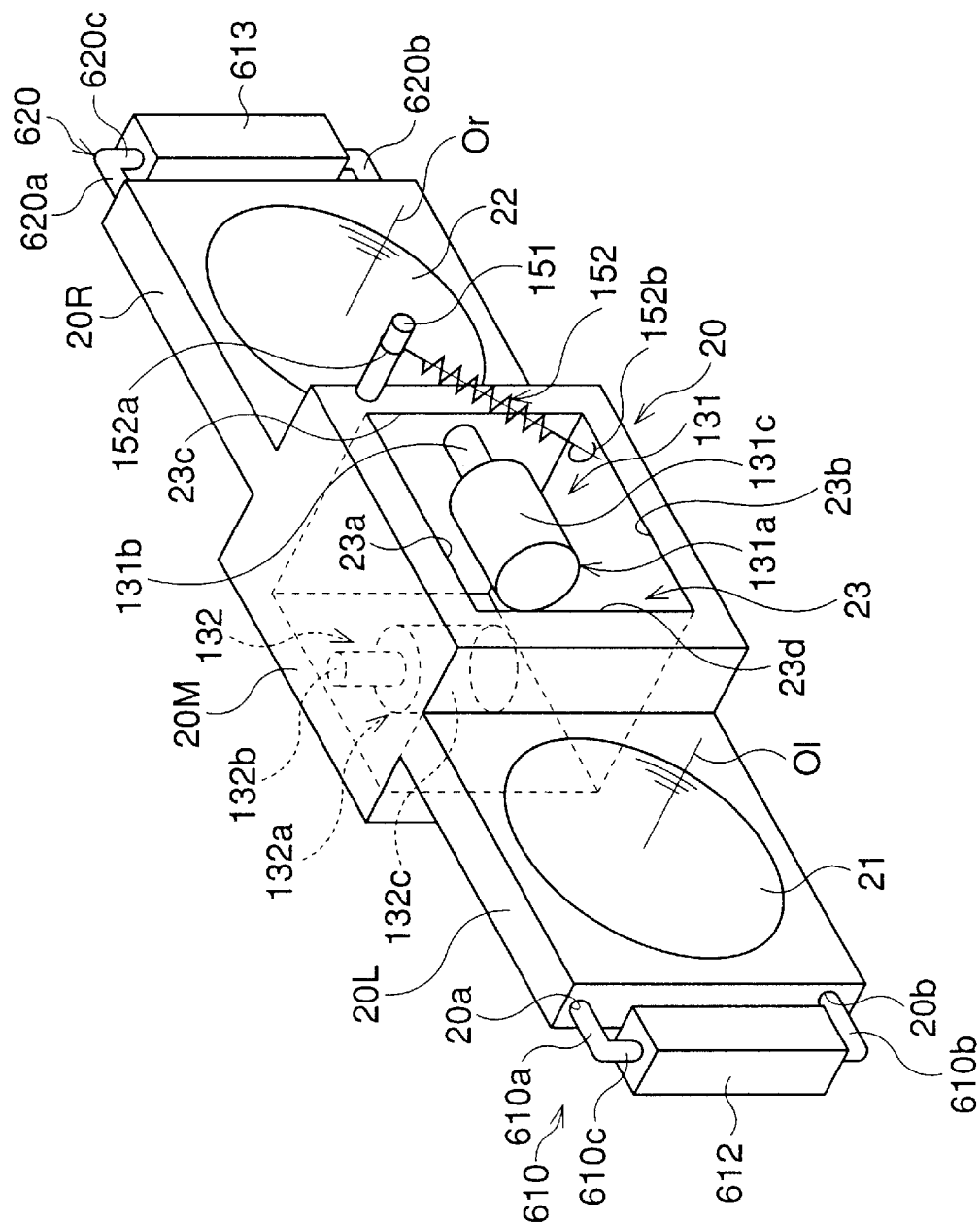
FIG. 6 is a perspective view of a mechanism for correcting the trembling of the focused image, to which a second embodiment, according to the present invention, is applied.
Figure 7:
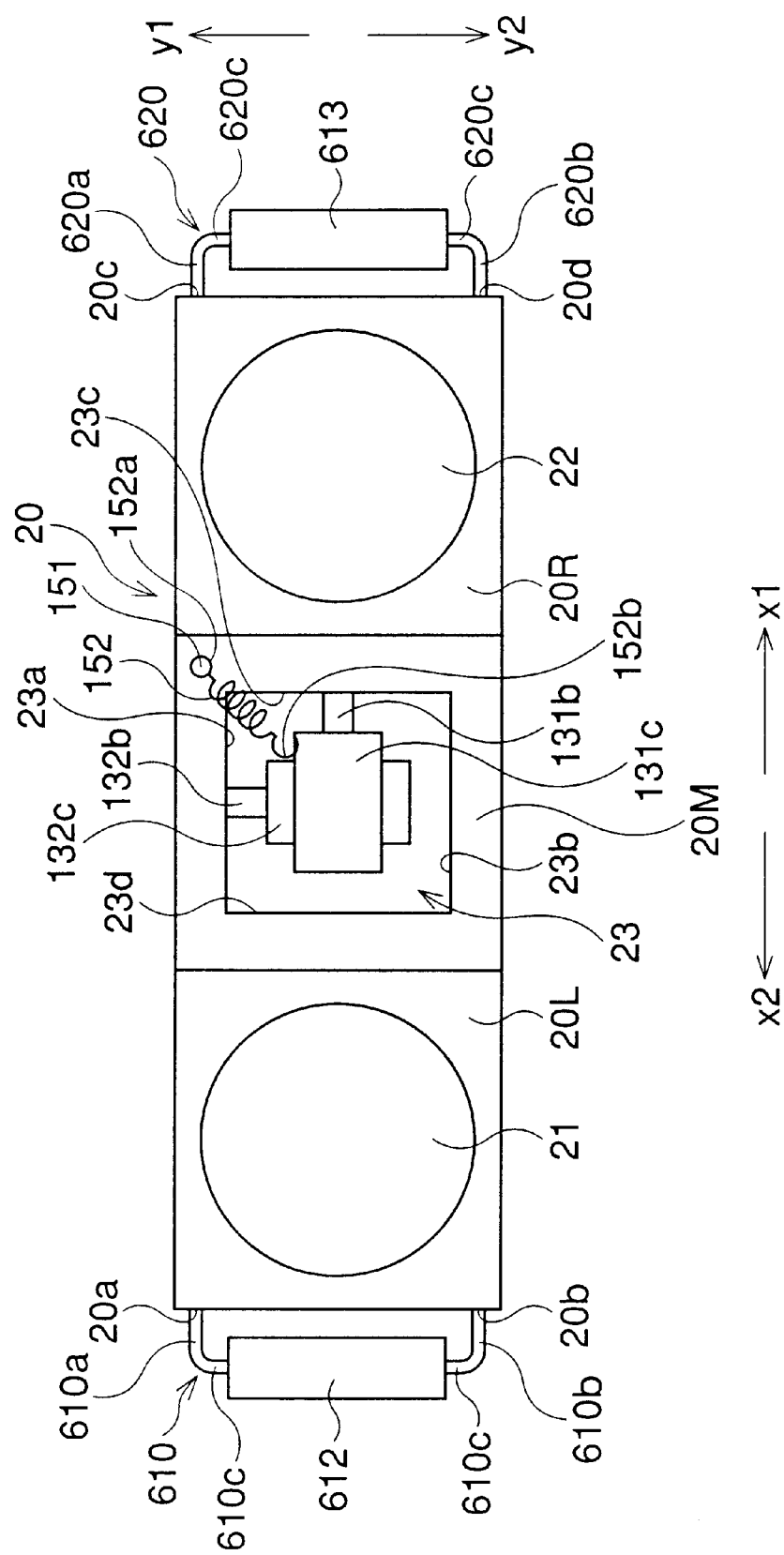
FIG. 7 is a front view of the second embodiment shown in FIG. 6.

FIG. 6 is a perspective view showing a mechanism for correcting a tremble of a focused image, to which the second embodiment, according to the present invention, is applied, and FIG. 7 is a front view of the second embodiment. In FIG. 6 and FIG. 7, components utilized in the second embodiment, which are identical in constitution and function to those used in the first embodiment, share the same reference numerals and are thus not described again in detail.

A lens holding frame, generally indicated by reference 20, comprises holding portions 20L and 20R, which hold the correction lenses 21 and 22, respectively, and a connecting portion 20M which connects the holding portion 20L and the holding portion 20R. The holding portion 20L and the holding portion 20R are plates, symmetrically placed about the connecting portion 20M, being thick enough to hold correction lenses 21 and 22. A configuration of the connecting portion 20M is cuboid, in which a through-hole 23 is formed. The through-hole 23 is defined by internal surfaces 23a and 23b, facing each other, which are parallel to a plane in which an optical axis Ol of the correction lens 21 and an optical axis Or of the correction lens 22 lie, and internal surfaces 23c and 23d, facing each other, which are perpendicular to the internal surfaces 23a and 23b.

The first direct-drive-type actuator 131 and the second direct-drive-type actuator 132, similar to those of the first embodiment, are disposed in the opening 23. The tip of the shaft 131b is in slidable contact with the internal surface 23c of the opening 23, and the tip of the shaft 132b is in slidable contact with the internal surface 23a of the opening 23. The first direct-drive-type actuator 131 and the second direct-drive-type actuator 132 are arranged in such a manner that each of the driving directions of the shafts 131b and 132b is perpendicular to the optical axes Ol and Or. Further, when the lens holding frame 20 is in the standard position, a center of mass of the first direct-drive-type actuator 131 and a center of mass of the second direct-drive-type actuator 132 lie on an axis parallel to the optical axes Ol and Or. The stepping motor 131a of the first direct-drive-type actuator 131 and the stepping motor 132a of the second direct-drive-type actuator 132 are attached to the inner surface of the binoculars 1 by supporting members (omitted in FIGS. 6 and 7).

The pin 151 is provided on the upper side surface adjacent to the holding portion 20R. One end 152a of the coil spring 152, identical to that of the first embodiment, is attached to the pin 151, and another end 152b of the coil spring 152 is engaged with a projecting portion (omitted in FIGS. 6 and 7) of the inner surface of the binoculars 1, so that the pin 151 of the lens holding frame 20 is urged in a direction, toward a plane in which the optical axes Ol and Or lie, having a declination of 45 degrees from the lateral direction when in the standard position. Accordingly, the lens holding frame 20 is resiliently biased by the coil spring 152, in such a manner that the tip of the shaft 131b of the first direct-drive-type actuator 131 is in slidable contact with the internal surface 23c of the through-hole 23 at all times, and the tip of the shaft 132b of the second direct-drive-type actuator 132 is in slidable contact with the internal surface 23a of the through-hole 23 at all times, whereby pressure exerted by the tip of the shaft 131b on the internal surface 23c and pressure exerted by the tip of the shaft 132b on the internal surface 23a are substantially equal.

A hole 20a and a hole 20b, which have a predetermined depth, are provided at the top and bottom, respectively, of the left side surface of the holding portion 20L. A central axis of the holes 20a and 20b is parallel to a plane in which the optical axes Ol and Or lie, and is perpendicular to the optical axes Ol and Or. Holes 20c and 20d, similar to the holes 20a and 20b, are provided at the top and bottom, respectively, of the right side surface of the holding portion 20R.

A guide bar 610 is similar to the guide bar 61 of the first embodiment. The guide bar 610 comprises lateral-direction guide portions 610a and 610b, and a lengthwise-direction guide portion 610c. The length of the lengthwise-direction guide portion 610c, along its central axis, approximately equals a distance between the holes 20a and 20b. The lateral-direction guide portion 610a is slidably received by the hole 20a, and the lateral-direction guide portion 610b is slidably received by the hole 20b.

Also, a guide bar 620, similar to the guide bar 61, comprises lateral-direction guide portions 620a and 620b, and a lengthwise-direction guide portion 620c. The length of the lengthwise-direction guide portion 620c, along its central axis, approximately equals a distance between the holes 20c and 20d. The lateral-direction guide portion 620a is slidably received by the hole 20c, and the lateral-direction guide portion 620b is slidably received by the hole 20d.

Namely, the lens holding frame 20 is supported by the guide bars 610 and 620, and can be moved, in the lateral direction, between the extremes of the leading-end faces of the lateral-direction guide portions 610a and 610b abutting against the bottom-end faces of the holes 20a and 20b, and the leading-end faces of the lateral-direction guide portions 620a and 620b abutting against the bottom-end faces of the holes 20c and 20d.

The lengthwise-direction guide portion 610c is supported by a projecting portion 612, formed on the inner surface of the outer frame of the binoculars 1, so as to be slidable in a longitudinal direction along the central axis, thereof. Similarly, the lengthwise-direction guide portion 620c is supported by a projecting portion 613, formed on the inner surface of the outer frame of the binoculars 1, so as to be slidable in a longitudinal direction along its central axis, thereof.

When the rotor of the stepping motor 131a of the first direct-drive-type actuator 131 is rotated clockwise, the shaft 131b extends in the direction x1 (see FIG. 7), so that the lens holding frame 20 is moved in the direction x1. When the rotor of the stepping motor 131a is rotated counterclockwise, the shaft 131b retracts in the direction x2 (see FIG. 7), so that the lens holding frame 20 is moved in the direction x2 due to the urging force of the coil spring 152.

When the rotor of the stepping motor 132a of the second direct-drive-type actuator 132 is rotated clockwise, the shaft 132b extends in the direction y1 (see FIG. 7), so that the lens holding frame 20 is moved in the direction y1. When the rotor of the stepping motor 132a is rotated counterclockwise, the shaft 132b retracts in the direction y2 (see FIG. 7), so that the lens holding frame 20 is moved in the direction y2 due to the urging force of the coil spring 152.

The motor case 131c of the stepping motor 131a and the motor case 132c of the stepping motor 132a are secured to an inner surface (omitted in FIGS. 6 and 7) of an outer frame of the optical device.

The first direct-drive-type actuator 131 and the second direct-drive-type actuator 132 are disposed in the through-hole 23 such that, during operation, the motor case 131c and the motor case 132c do not contact the internal surfaces 23a, 23b, 23c and 23d.

The stepping motors 131a and 132a are connected to respective gyro sensors, VF convertors and driving circuits, similar to those of the first embodiment. Accordingly, the rotors of the stepping motors 131a and 132a are rotated clockwise or counterclockwise by a predetermined amount, corresponding to the movement of the binoculars 1 from the standard position, so that the lens holding frame 20 is repositioned, enabling cancellation of the movement of the image, whereby the tremble of the image is corrected.

Figure 8:
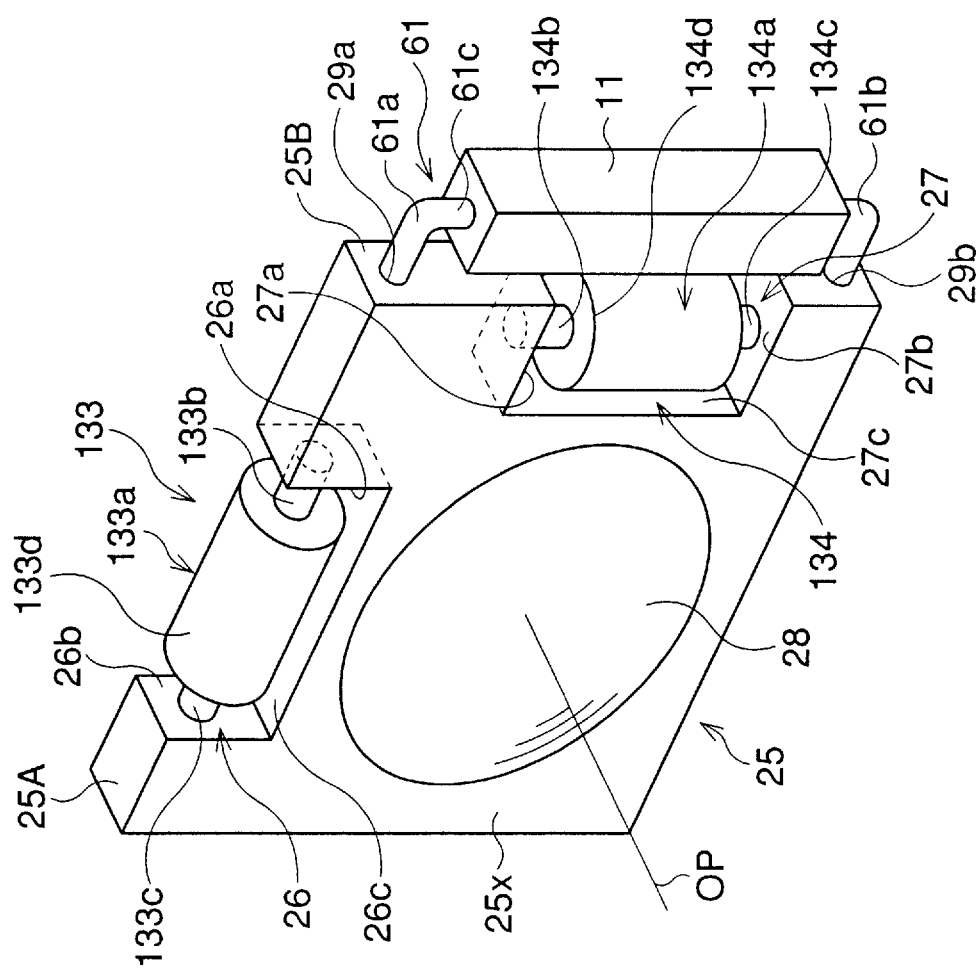
FIG. 8 is a perspective view of a mechanism for correcting the trembling of the focused image, to which a third embodiment, according to the present invention, is applied.
Figure 9:
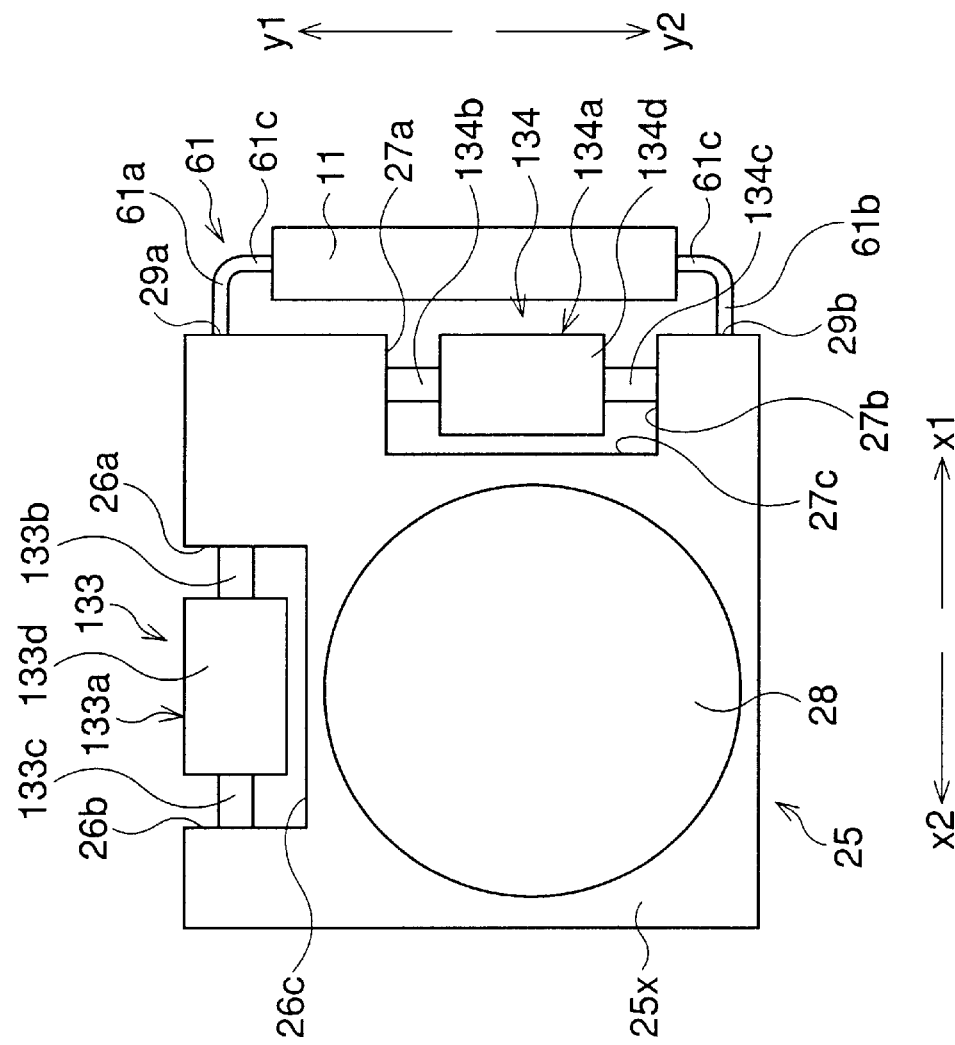
FIG. 9 is a front view of the third embodiment shown in FIG. 8.

FIG. 8 is a perspective view showing a mechanism for correcting a tremble of a focused image, to which a third embodiment, according to the present invention, is applied, and FIG. 9 is a front view of the third embodiment. In FIG. 8 and FIG. 9, components utilized in the third embodiment, which are identical in constitution and function to those used in the first embodiment, share the same reference numerals and are thus not described again in detail.

A first direct-drive-type actuator, generally indicated by reference 133, is disposed in the recess portion 26, and a second direct-drive-type actuator, generally indicated by reference 134, is disposed in the recess portion 27. The first direct-drive-type actuator 133 comprises a stepping motor 133a, and shafts 133b, 133c (movable portions). The stepping motor 133a comprises a motor case 133d and a rotor (omitted in FIGS. 8 and 9) mounted in the motor case 133d. The rotor can be rotated clockwise and counterclockwise around a central longitudinal axis of the shafts 133b and 133c.

The shafts 133b and 133c are supported so as to be movable in the longitudinal direction thereof and rotatable in accordance with the rotational operation of the rotor. Threads (omitted in FIGS. 8 and 9) are formed on the outer surface of the shafts 133b and 133c, and the shafts 133b and 133c are respectively engaged with female thread (omitted in FIGS. 8 and 9) formed on the inner surface of quills of the motor case 133d.

Namely, when the rotor is rotated clockwise, the shaft 133b extends and the shaft 133c retracts in the longitudinal direction thereof, with a clockwise rotation. When the rotor is rotated counterclockwise, the shaft 133b retracts and the shaft 133c extends in the longitudinal direction thereof with a counterclockwise rotation. The tip (projecting end-face) of the shaft 133b is in slidable contact with the surface 26a at all times, and the tip (projecting end-face) of the shaft 133c is in slidable contact with the surface 26b at all times.

The second direct-drive-type actuator, generally indicated by reference 134, has a construction similar to that of the first direct-drive-type actuator 133. A rotor of a stepping motor 134a can be rotated clockwise and counterclockwise around a central longitudinal axis of the motor case 134d.

When the rotor is rotated clockwise, the shaft 134*b* extends and the shaft 134*c* retracts in the longitudinal direction thereof, with a clockwise rotation. When the rotor is rotated counterclockwise, the shaft 134*b* retracts and the shaft 134*c* extends in the longitudinal direction thereof, with a counterclockwise rotation. The tip of the shaft 134*b* is in slidable contact with the surface 27*a* at all times, and the tip of the shaft 134*c* is in slidable contact with the surface 27*b* at all times.

When the rotor of the stepping motor 133*a* is rotated clockwise, the shaft 133*b* extends in the direction x1 (see FIG. 9) and the shaft 133*c* retracts, so that the lens holding frame 25 is moved in the direction x1. On the other hand, when the rotor of the stepping motor 133*a* is rotated counterclockwise, the shaft 133*b* retracts and the shaft 133*c* extends in the direction x2 (see FIG. 9), so that the lens holding frame 25 is moved in the direction x2.

When the rotor of the stepping motor 134*a* is rotated clockwise, the shaft 134*b* extends in the direction y1 (see FIG. 9) and the shaft 134*c* retracts, so that the lens holding frame 25 is moved in the direction y1. On the other hand, when the rotor of the stepping motor 134*a* is rotated counterclockwise, the shaft 134*b* retracts and the shaft 134*c* extends in the direction y2 (see FIG. 9), so that the lens holding frame 25 is moved in the direction y2.

The first direct-drive-type actuator 133 and the second direct-drive-type actuator 134 are respectively disposed in the recess portions 26 and 27 such that, during operation, the motor case 133*d* and the motor case 134*d* do not contact the lens holding frame 25.

A connection among the stepping motors 133*a* and 134*a*, gyro sensors, VF convertors and driving circuits, is similar to those of the first embodiment. The rotors of the stepping motors 133*a* and 134*a* are rotated by a predetermined amount and speed, clockwise or counterclockwise, in accordance with the displacement of the optical device from the standard position as detected by the gyro sensors. The lens holding frame 25 is repositioned so as to cancel the movement of the image, enabling the tremble of the image to be corrected.

Figure 10:
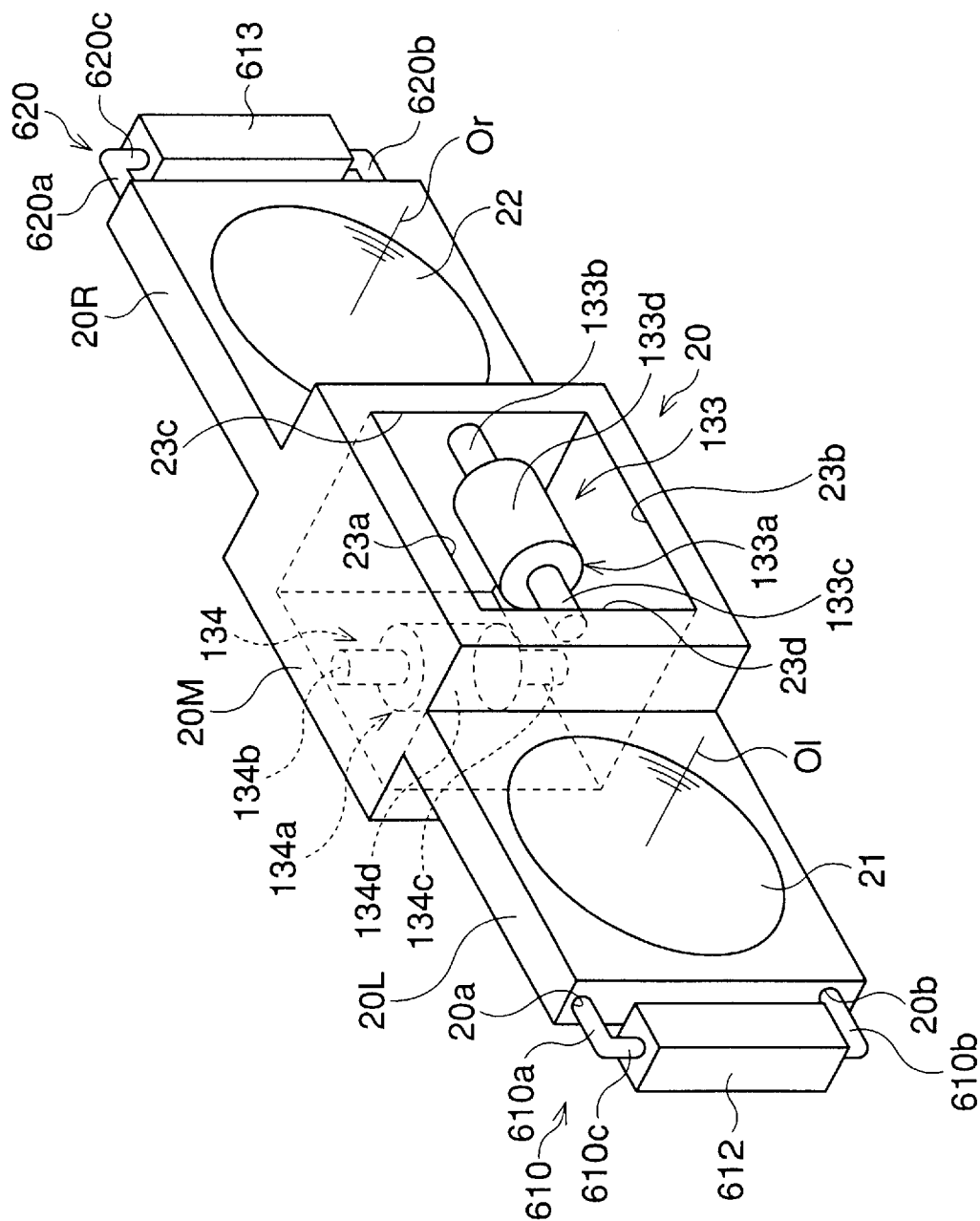
FIG. 10 is a perspective view of a mechanism for correcting the trembling of the focused image, to which a fourth embodiment, according to the present invention, is applied.
Figure 11:
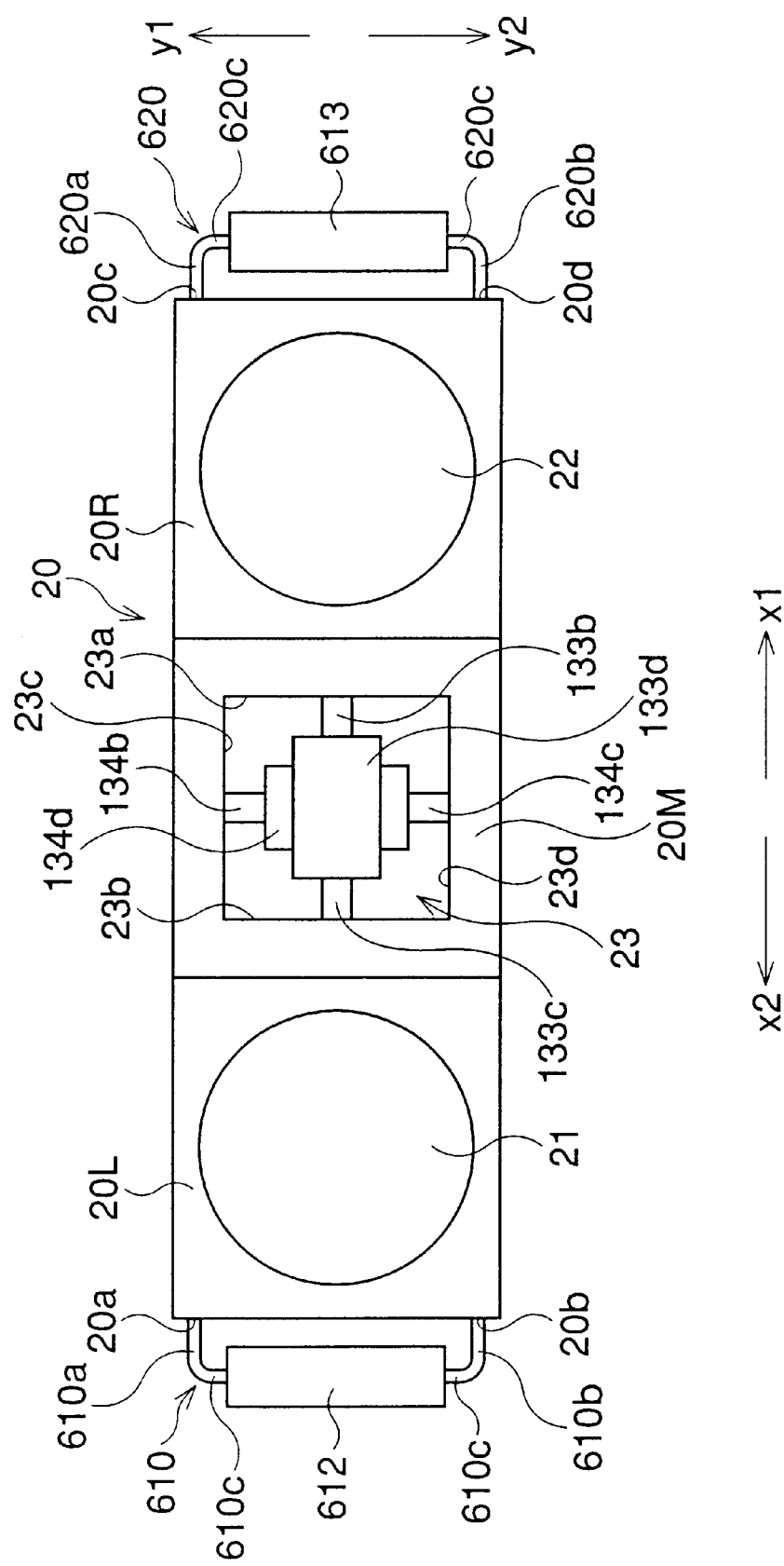
FIG. 11 is a front view of the fourth embodiment shown in FIG. 10.

FIG. 10 is a perspective view showing a mechanism for correcting a tremble of a focused image, to which a fourth embodiment, according to the present invention, is applied, and FIG. 11 is a front view of the fourth embodiment. In FIG. 10 and FIG. 11, components utilized in the fourth embodiment, which are identical in constitution and function to those of the second and third embodiments, share the same reference numerals and are thus not described again in detail.

The first direct-drive-type actuator 133 and the second direct-drive-type actuator 134 are disposed in the opening 23. The tip of the shaft 133*b* and the tip of the shaft 133*c*, of the first direct-drive-type actuator 133, are in slidable contact with the inner surfaces 23*c* and 23*d*, respectively, at all times. The tip of the shaft 134*b* and the tip of the shaft 134*c*, of the second direct-drive-type actuator 134, are in slidable contact with the inner surfaces 23*a* and 23*b*, respectively, at all times. Further, a connection among the stepping motors 133*a* and 134*a*, gyro sensors, VF convertors and driving circuits, is similar to that of the first embodiment.

The lens holding frame 20 is repositioned, enabling cancellation of the displacement of binoculars of the fourth embodiment from the standard position as detected by the gyro sensors, so that the tremble of the image is corrected.

The first direct-drive-type actuator 133 and the second direct-drive-type actuator 134 are disposed in the through-hole 23 such that, during operation, the motor case 133*d* and the motor case 134*d* do not contact the internal surfaces 23*a*, 23*b*, 23*c* and 23*d*.

According to the first through fourth embodiments, the direct-drive-type actuators, which drive the lens holding frame, are disposed in the recesses or the opening of the lens holding frame, enabling the optical device to be compact.

Further, the direct-drive-type actuators are utilized as a mechanism for driving the lens holding frame, enabling the control of the mechanism to be simplified.

According to the first and second embodiments, the lens holding frame is resiliently biased in a predetermined direction at all times, preventing backlash while the shafts are driven.

Figure 12:
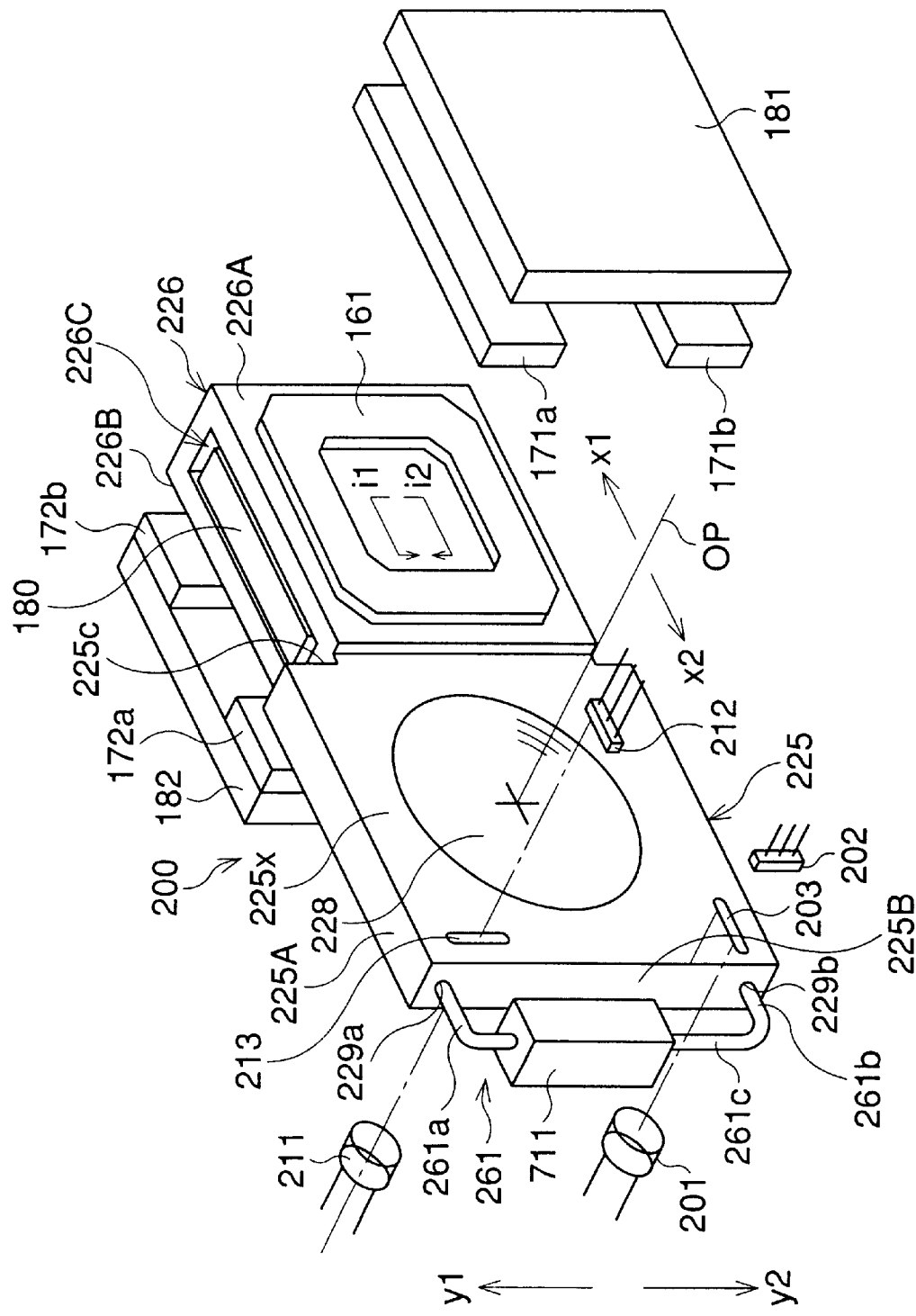
FIG. 12 is a perspective view, with certain parts exploded, showing a correction mechanism to which a fifth embodiment, according to the present invention, is applied.

FIG. 12 is a perspective view, with certain parts exploded, showing a correction mechanism to which a fifth embodiment, according to the present invention, is applied.

A lens holding member, generally indicated by reference 200, comprises a lens supporting frame 225 and a coil holding frame 226. The lens supporting frame 225 is a plate, a plane surface 225X of which is perpendicular to an optical axis OP of a correction lens 228. An upper side surface 225A of the lens holding member 225 is perpendicular to the plane surface 225X, and is parallel to a plane proceeding in the lateral direction, in which the optical axis OP lies. A left side surface 225B of the lens supporting frame 225 is perpendicular to the plane surface 225X, and is parallel to a plane, proceeding in the lengthwise direction, in which the optical axis OP lies. A hole 229*a* and a hole 229*b*, which have a predetermined depth, are provided at the top and bottom, respectively, of the left side surface 225B. A central axis of the holes 229*a* and 229*b* is parallel to the upper side surface 225A. A guide bar 261 comprises lateral-direction guide portions 261*a* and 261*b*, which are parallel to each other, and a lengthwise-direction guide portion 261*c*, which connects the lateral-direction guide portions 261*a* and 261*b*. The length of the lengthwise-direction guide portion 261*c*, along its central axis, approximately equals a distance between the holes 229*a* and 229*b*. The lateral-direction guide portion 261*a* is slidably received by the hole 229*a*, and the lateral-direction guide portion 261*b* is slidably received by the hole 229*b*.

The lengthwise-direction guide portion 261*c* is supported by a projecting portion 711, formed on an inner surface (omitted in FIG. 12) of an outer frame of an optical device to which the fifth embodiment is applied, so as to be slidable in a longitudinal direction along the central axis thereof.

The coil holding frame 226 is unitarily provided on a right side surface 225C of the lens supporting frame 225. A configuration of the coil holding frame 226 is generally rectangular parallelepiped and includes an open portion. A through-hole 226C, being the open portion, is formed in the coil holding frame 226. A first yoke 180 is disposed in the through-hole 226C and is attached to the inner surface of the outer frame (omitted in FIG. 12) of the optical device. Further, the spatial arrangement of the through-hole 226C is such that, during operation, no portions of the first yoke 180 contact the internal surfaces of the through-hole 226C. A first coil 161 is formed on an outer surface 226A, which is perpendicular to the optical axis OP of the correction lens 228, of the coil holding frame 226.

The first coil 161 is a flat coil. Namely, a leading wire of the first coil 161 is rotated around an axis parallel to the optical axis OP, and a thickness of the first coil 161 along the axis is less than a diameter of the first coil 161 along a plane perpendicular to the axis.

Further, a second coil 162, similar to the first coil 161, is formed on an outer surface 226B, opposite to the outer surface 226A.

A second yoke 181 is a plate, with a configuration and size being generally similar to the outer surfaces 226A and 226B. A first magnet 171a and a second magnet 171b are magnetically attached to a plane surface of the second yoke 181. The second yoke 181 is attached to the inner surface of the outer frame of the optical device, in such a manner that a longitudinal direction of the first magnet 171a and the second magnet 171b is perpendicular to the lengthwise-direction guide portion 61c, whereby the first magnet 171a and the second magnet 171b face the first coil 161.

A third yoke 182 is a plate similar to the second yoke 181. A third magnet 172a and a fourth magnet 172b are magnetically attached to a plane surface of the third yoke 182. The third yoke 182 is attached to the inner surface of the outer frame of the optical device, in such a manner that a longitudinal direction of the third magnet 172a and the fourth magnet 172b is perpendicular to the lateral-direction guide portions 61a and 61b, and that the third magnet 172a and the fourth magnet 172b face the second coil 162.

Figure 13:
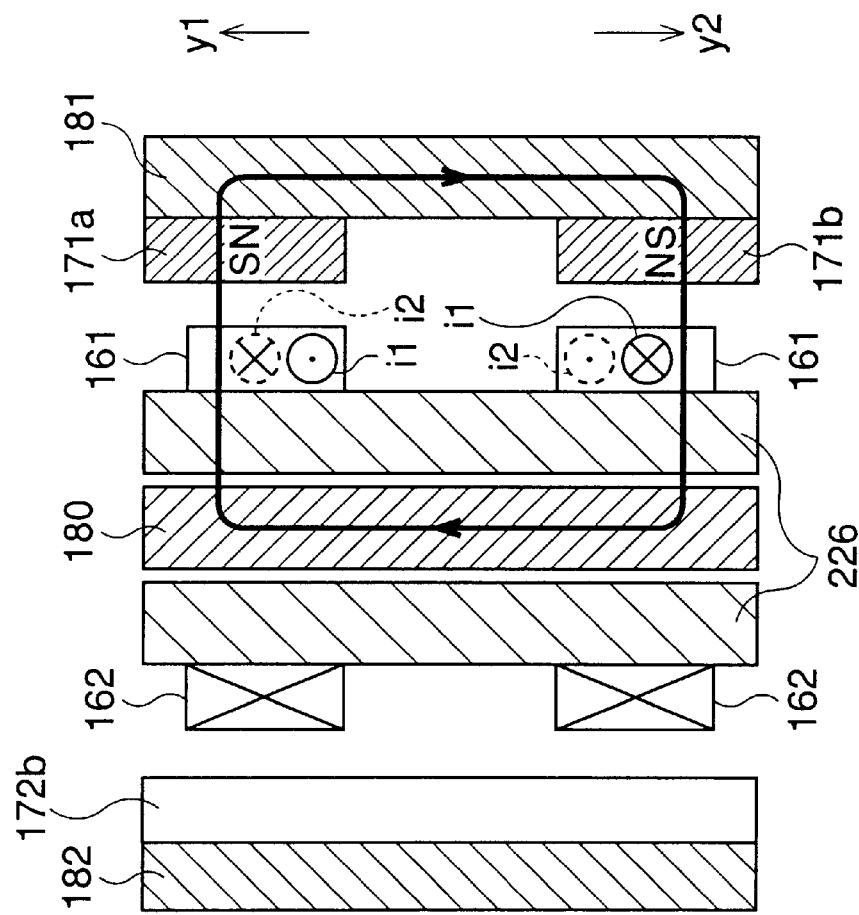
FIG. 13 is a sectional side view of the correction mechanism of the fifth embodiment.

FIG. 13 is a sectional side view of the coil holding frame 226 and portions adjacent to the coil holding frame 226, viewed from the lens supporting frame 225, taken along a central portion of the coil holding frame 226 in a plane parallel to the left side surface 225B. In the first magnet 171a, a side, which is attached to the second yoke 181, is the North pole, and a side, which faces the first coil 161, is the South pole. In the second magnet 171b, a side, which is attached to the second yoke 181, is the South pole, and a side, which faces the first coil 161, is the North pole. Namely, the first coil 161 is positioned in the magnetic field, produced by the first magnet 171a, the second magnet 171b, the first yoke 180 and the second yoke 181, so that a magnetic flux acts on the first coil 161.

Accordingly, when a current flows through the first coil 161 in the direction i1, counterclockwise in FIG. 12, an induced electromagnetic force acts on the first coil 161 in the direction y1, so that the coil holding frame 226 and the lens supporting frame 225 are moved in the direction y1. When a current flows through the second coil 161 in the direction i2, clockwise in FIG. 12, an induced electromagnetic force acts on the first coil 161 in the direction y2, so that the coil holding frame 226 and the lens supporting frame 225 are moved in the direction y2.

Figure 14:
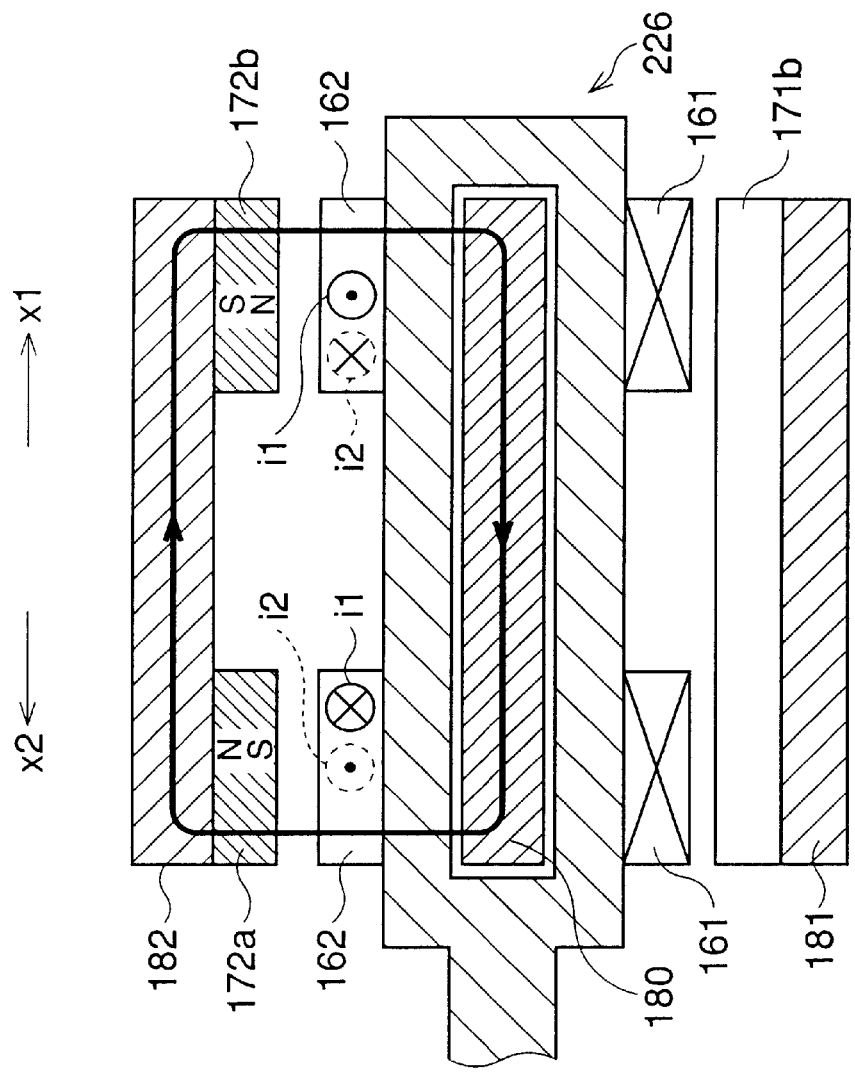
FIG. 14 is a sectional plan view of the correction mechanism of the fifth embodiment.

FIG. 14 is a sectional plan view of the coil holding frame 226 and portions adjacent to the coil holding frame 226, taken along a central portion of the coil holding frame 226 in a plane parallel to the upper side surface 225A.

In the third magnet 172a, a side, which is attached to the third yoke 182, is the North pole, and a side, which faces the second coil 162, is the South pole. In the fourth magnet 172b, a side, which is attached to the third yoke 182, is the South pole, and a side, which faces the second coil 162, is the North pole. Namely, as shown in FIG. 14, the second coil 162 is positioned in the magnetic field, produced by the third magnet 172a, the fourth magnet 172b, the first yoke 180 and the third yoke 182, so that a magnetic flux acts on the second coil 162.

Accordingly, when a current flows through the second coil 162 in the direction i1 (see FIG. 14), an induced electromagnetic force acts on the second coil 162, in the direction x1, so that the coil holding frame 226 and the lens supporting frame 225 are moved in the direction x1. When a current flows through the second coil 162 in the direction i2 (see FIG. 14), an induced electromagnetic force acts on the second coil 162, in the direction x2, so that the coil holding frame 226 and the lens supporting frame 225 are moved in the direction x2.

As shown in FIG. 12, a first hole 203 is formed in the lens supporting frame 225, in the direction parallel to the optical axis OP, at the bottom adjacent to the left side surface 225B. A longitudinal direction of a sectional view of the first hole 203, taken along a plane perpendicular to the optical axis OP, is parallel to the longitudinal central axes of the lateral-direction guide portions 261a and 261b of the guide bar 261. A second hole 213 is formed in the lens supporting frame 225, in the direction parallel to the optical axis OP, at the top adjacent to the left side surface 225B. A longitudinal direction of a sectional view of the second hole 213, taken along a plane perpendicular to the optical axis OP, is parallel to the longitudinal central axis of the lengthwise-direction guide portion 261c of the guide bar 261.

A first LED (Light Emitting Diode) 201, disposed a predetermined distance from the lens supporting frame 225, corresponds to the first hole 203. A first PSD (Position Sensitive Device) 202, operating in association with the first LED 201 and the first hole 203, is disposed at a side of the lens supporting frame 225 opposite to the side at which the first LED 201 is disposed. The first PSD 202 includes a pair of output electrodes and a power electrode. A difference between values of electric current, which flows out of each output electrode, is generated in accordance with a position of an incident light on the first PSD 202. In the first PSD 202, the position of the incident light is calculated on the basis of the difference, so that the first PSD 202 outputs a position signal indicating the displacement of the correction lens 28 from the standard position, with respect to the lengthwise direction.

Similarly, a second LED 211, disposed a predetermined distance from the lens supporting frame 225, corresponds to the second hole 213. A second PSD 212, operating in association with the second LED 211 and the second hole 213, is disposed at a side of the lens supporting frame 225, opposite to the side at which the second LED 211 is disposed. The second PSD 212 includes a pair of output electrodes and a power electrode. A difference between values of electric current, which flows out of each output electrode, is generated in accordance with a position of an incident light on the second PSD 212. In the second PSD 212, the position of the incident light is calculated on the basis of the difference, so that the second PSD 212 outputs a position signal indicating the displacement of the correction lens 28 from the standard position, with respect to the lateral direction.

The first LED 201, the second LED 211, the first PSD 202 and the second PSD 212 are respectively attached to an inner surface (omitted in FIG. 12) of an outer frame of the optical device.

The first LED 201 and the first PSD 202 are arranged in such a manner that a luminance flux outputted from the first LED 201 passes through the first hole 203 and is incident on the first PSD 202. When the lens supporting frame 225 is moved in the lengthwise direction, being led by the lengthwise-direction guide portion 261c of the guide bar 261, the positional relationship of the first hole 203 to the first LED 201 and the first PSD 202 is changed, so that the position signal indicating the displacement of the correction lens 228, with respect to the lengthwise direction, is outputted from the first PSD 202.

Similarly, the second LED 211 and the second PSD 212 are arranged in such a manner that a luminance flux outputted from the second LED 211 passes through the second hole 213 and is incident on the second PSD 212. When the lens supporting frame 225 is moved in the lateral direction, being led by the lateral direction guide portions 261a and 261b of the guide bar 261, the positional relationship of the second hole 213 to the second LED 211 and the second PSD 212 is changed, so that the position signal indicating the displacement of the correction lens 228, with respect to the lateral direction, is outputted from the second PSD 212.

Figure 15:
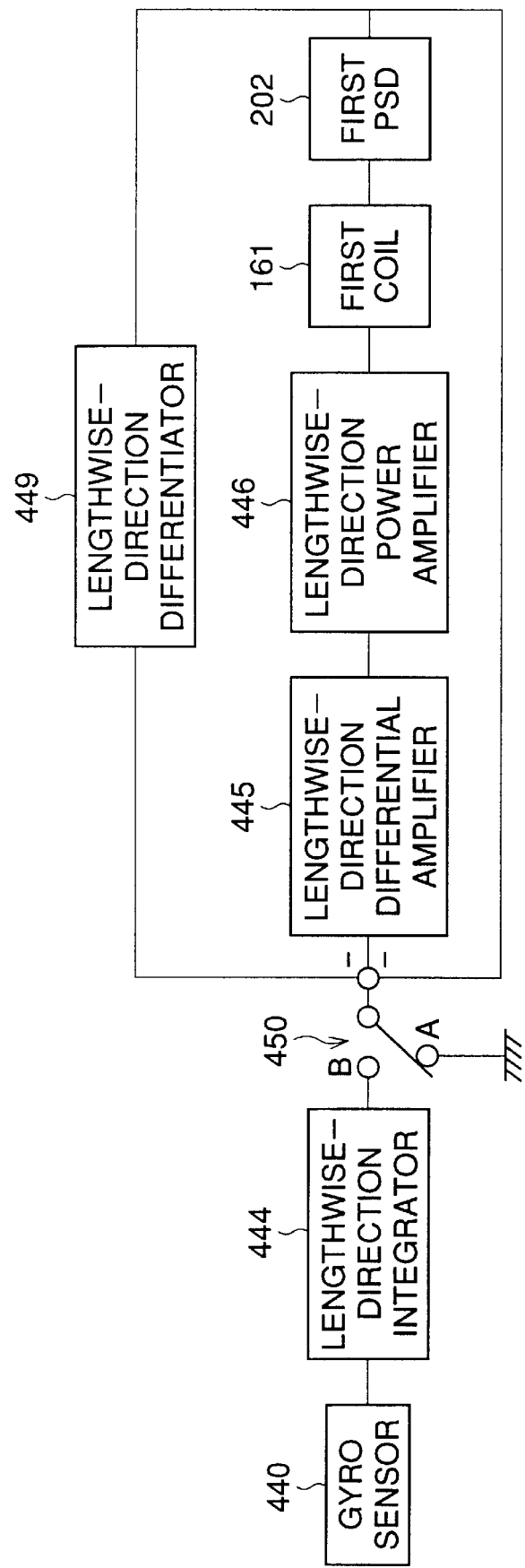
FIG. 15 is a block diagram of a correction lens driving circuit.

FIG. 15 is a block diagram of a correction lens driving circuit for correcting a movement of an optical axis of the optical device in the lengthwise direction. Note that, another correction lens driving circuit, similar to the correction driving circuit described below, is provided for correcting a movement of the optical axis of the optical device in respect to the lateral direction.

An operating switch 450 is connected to a lengthwise-direction integrator 444. The operating switch 450 is initially set to position A. When the correction of the tremble of the image is performed, the operating switch 450 is switched to position B. When the operating switch 450 is set to position A, a current flows through the first coil 161 in a predetermined direction, enabling the correction lens 228 to be positioned at the standard position. Namely, by setting the operating switch 450 to position A, the lens supporting frame 225 is driven so that the correction lens 228 is positioned at the standard position.

A gyro sensor 440 detects a direction and an angular speed of a movement of the optical device, due to a hand tremble, and outputs voltage signals corresponding to the detected result. The lengthwise-direction integrator 444 is connected to the gyro sensor 440. The lengthwise-direction integrator 444 integrates the voltage signal of the angular speed, outputted from the gyro sensor 440, and outputs the integrated voltage signal of the angular speed and the voltage signal of the direction. When the operating switch 450 is set to position B, in order to correct the tremble of the image, the voltage signals, i.e. the integrated voltage signal derived from the angular speed and the voltage signal derived from the direction, are inputted to a lengthwise-direction differential amplifier 445. Further, the position of the correction lens 228 in the lengthwise direction, is detected by the first PSD 202. The first PSD 202 outputs the position signal.

The voltage signals according to the movement of the optical device, outputted from the lengthwise-direction integrator 444, and the position signal outputted from the first PSD 202, are compared and amplified by the lengthwise-direction differential amplifier 445, and power-amplified by a lengthwise-direction power amplifier 446, then a resultant current is outputted from the lengthwise-direction power amplifier 446. The lengthwise-direction power amplifier 446 is connected to the first coil 161. Namely, the current, outputted from the lengthwise-direction power amplifier 446, flows through the first coil 161, so that the lens supporting frame 225 is moved in a lengthwise direction, whereby the displacement of the optical axis due to the movement of the optical device is canceled. Further, a lengthwise-direction differentiator 449 is connected to the first PSD 202, whereby the drive of the lens supporting frame 225 is stabilized.

Similarly, in a correction lens driving circuit, which corrects a movement of the optical axis in the lateral direction, a lateral-direction differential amplifier, a lateral-direction power amplifier, the second PSD 212, and a lateral-direction differentiator are connected to the second coil 162, so that the lens supporting frame 225 is driven in the lateral direction, whereby the displacement of the optical axis in the lateral direction is canceled.

Figure 16:
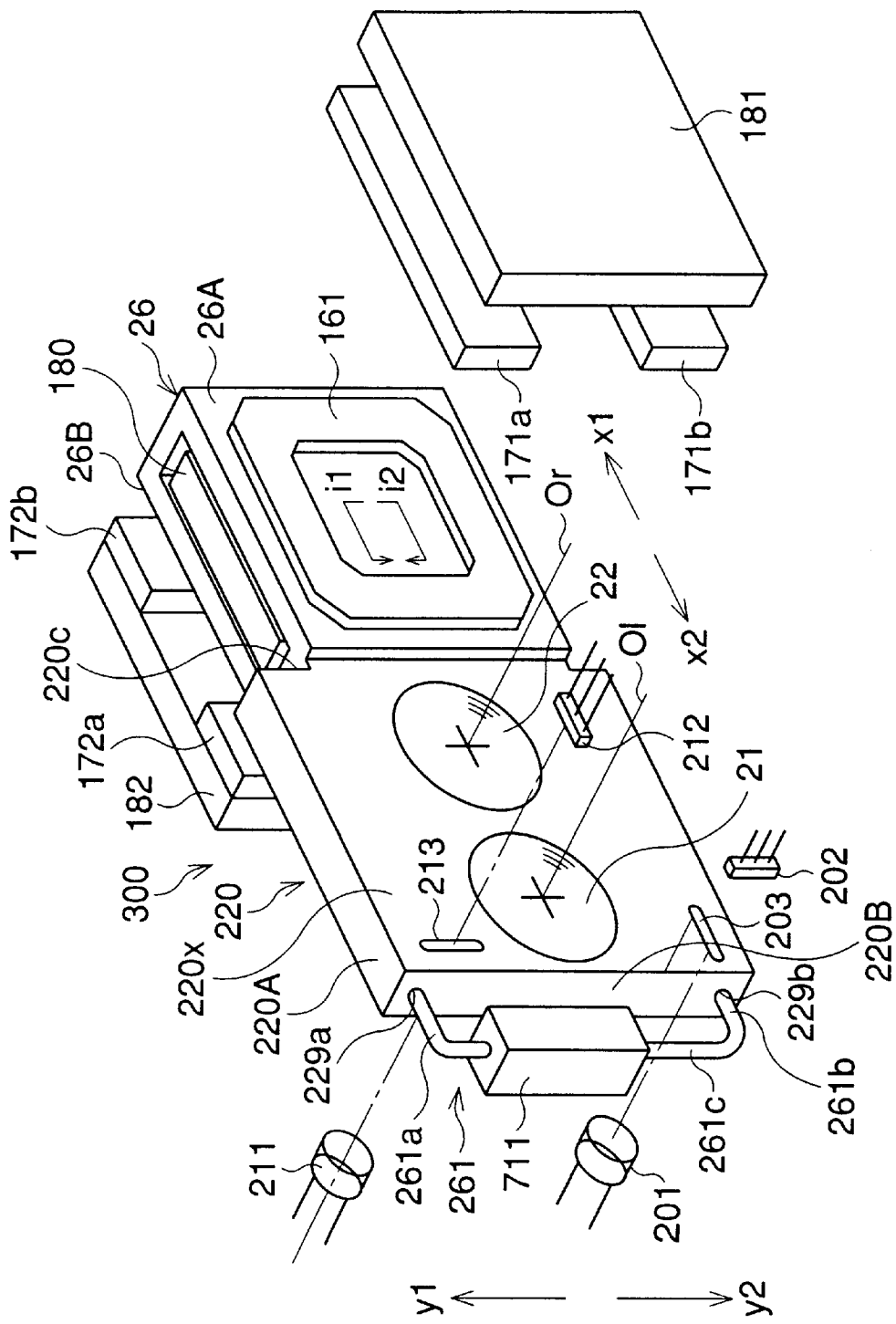
FIG. 16 is a perspective view, with certain parts exploded, showing a correction mechanism to which a sixth embodiment, according to the present invention, is applied.

FIG. 16 is a perspective view, with certain parts exploded, showing a correction mechanism to which a sixth embodiment, according to the present invention, is applied. In FIG. 16, components utilized in the sixth embodiment, which are identical in constitution and function to those in the fifth embodiment, share the same reference numerals and are thus not described again in detail.

A holding member, generally indicated by reference 300, comprises a lens supporting frame 220 and a coil holding frame 226. A pair of correction lenses, 21 and 22 are unitarily held by the lens supporting frame 220. The guide bar 261, which is provided at a side surface 220B, has a similar construction to that of the fifth embodiment. The coil holding frame 226 is unitarily provided on a side surface 220c of the lens supporting frame 220. The second yoke 181, the first magnet 171a, the second magnet 171b, the third yoke 182, the third magnet 172a and the fourth magnet 172b, have identical configurations to those of the fifth embodiment. The first LED 201, the first PSD 202 and the first hole 203 are provided for detecting the position of the lens supporting frame 220 in the lengthwise direction. The second LED 211, the second PSD 212 and the second hole 213 are provided for detecting the position of the lens supporting frame 220 in the lateral direction.

Namely, when a predetermined magnitude current flows through the first coil 161 in a predetermined direction, the lens supporting frame 220 is moved at a rate in a corresponding lengthwise direction, and when a predetermined magnitude current flows through the second coil in a predetermined direction, the lens supporting frame 220 is moved at a rate in a corresponding lateral direction.

Further, gyro sensors, integrators, differential amplifiers, power amplifiers and operating switches, which are similar to those of the fifth embodiment, are respectively connected to the first coil 161 and the second coil (omitted in FIG. 16).

Accordingly, currents flow through the first coil 161 and the second coil, so that the difference between the position signals of the lens supporting frame 220, which is detected by the first PSD 202 and the second PSD 212, and the movement of the optical device, detected by the gyro sensors, are canceled.

Figure 17:
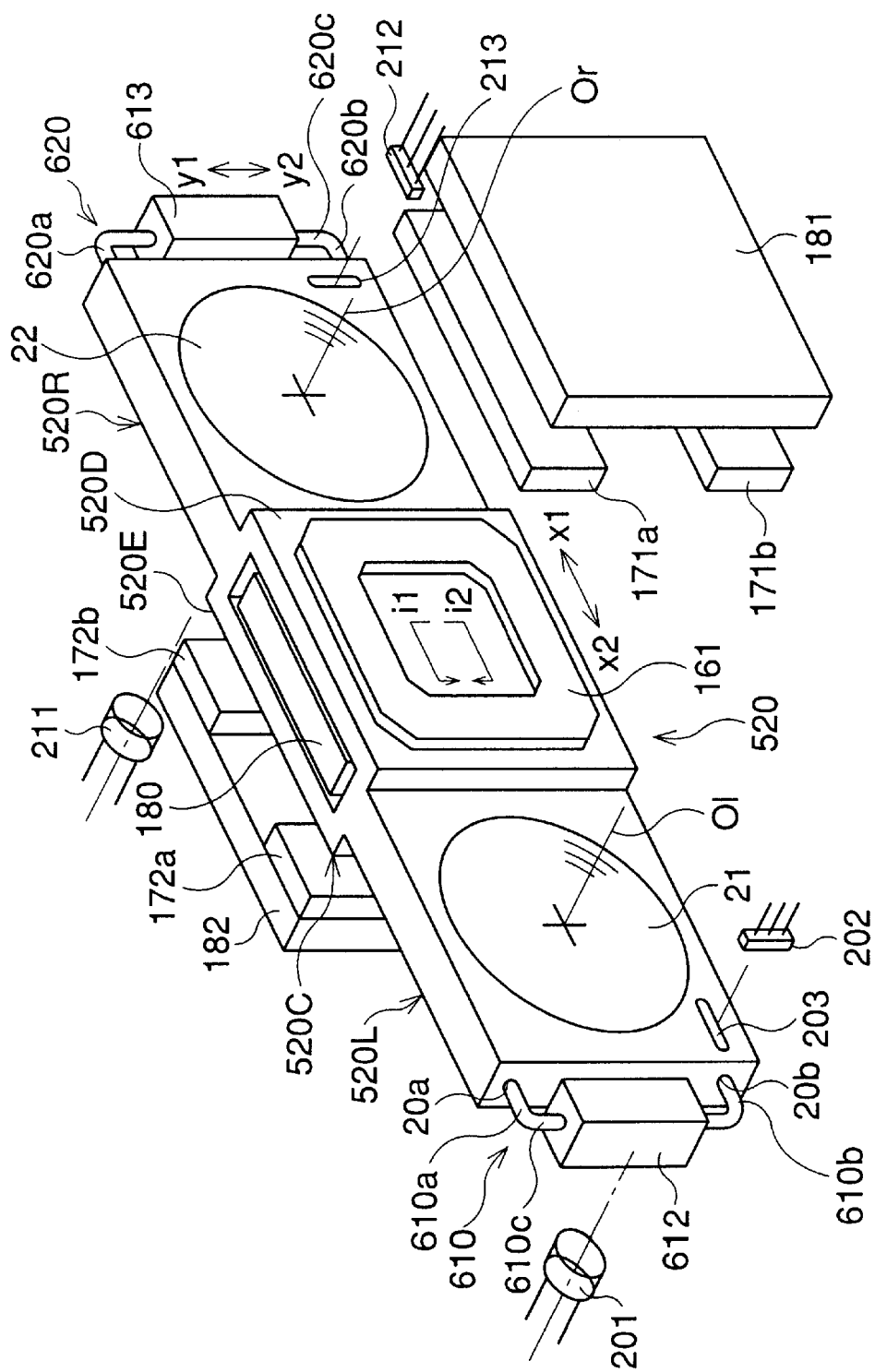
FIG. 17 is a perspective view, with certain parts exploded, showing a correction mechanism to which a seventh embodiment, according to the present invention, is applied.

FIG. 17 is a perspective view, with certain parts exploded, showing a correction mechanism to which a seventh embodiment, according to the present invention, is applied. In FIG. 17, components utilized in the seventh embodiment, which are identical in constitution and function to those of the other embodiments, share the same reference numerals and are thus not described again in detail.

A lens holding frame, generally indicated by reference 520, comprises holding portions 520L and 520R, which hold correction lenses 21 and 22, respectively, and a connecting portion 520C which connects the holding portion 520L and the holding portion 520R. The holding portion 520L and the holding portion 520R, being symmetrically placed about the connecting portion 520C, are plates which are of a suitable thickness to enable correction lenses 21 and 22 to be held.

The construction of the guide bars 610 and 620 are similar to those of the second and the fourth embodiments.

A configuration of the connecting portion 520C is generally rectangular parallelepiped, with the inclusion of an open portion. The first coil 161 is formed on a plane surface 520D of the connecting portion 520C, and the second coil (omitted in FIG. 17) is formed on a plane surface 520E of the connecting portion 520C. Other constructions of a driving mechanism for the lens holding frame 520 are similar to those of the fifth and sixth embodiments.

The hole 203 is formed at the bottom of the left side of the holding portion 520L, whereas the hole 213 is formed at the bottom of the right side of the holding portion 520R. A mechanism detecting the position of the lens holding frame 520 is similar to that of the fifth and sixth embodiments.

Further, the driving circuits of the correction lenses 21 and 22, with respect to the lateral direction and the lengthwise direction are similar to those of the fifth embodiment.

According to the fifth through seventh embodiments, a pair of correcting mechanisms are arranged along an axis parallel to the optical axis of a correction lens, so that a required space around the correcting lens is minimized.

Further, the first yoke is utilized for correcting the trembles in both the lateral direction and the lengthwise direction, so that a number of members necessary for the correcting mechanism is reduced.

In the driving mechanisms of the two directions, which cross at right angles, similar coils, being flat coils having generally square configurations, are utilized, so that yokes and magnets of similar configurations, can be utilized in the driving mechanisms.

Further, the positional relationship of the coil, the magnet and the yoke, in the driving mechanisms of the two directions are similar. Accordingly, each of the driving mechanisms can be utilized for either of the two directions. Also the mounting of each of the two driving mechanisms is similar, thus simplifying construction.

According to the seventh embodiment, the driving mechanisms are disposed between a pair of the correction lenses, so that the correcting mechanism is well balanced.

Although the embodiments of the present invention have been described herein with reference to the accompanying drawings, obviously many modifications and changes may be made by those who are skilled in this art without departing from the scope of the invention.

The present disclosure relates to subject matter contained in the following Japanese Patent Applications: No. 09-137793 (filed on May 12, 1997), No. 09-139201 (filed on May 14, 1997), and No. 09-145768 (filed on May 20, 1997), which are expressly incorporated herein, by reference, in their entirety.

We claim:

1. A lens driving mechanism comprising:

a holding member that holds at least one lens; and a plurality of direct-drive-type actuators that drive said holding member in a plane perpendicular to an optical axis of said lens, each of said plurality of direct-drive-type actuators includes a stepping motor and a shaft each said shaft being in direct contact with a surface portion of said holding member, each said shaft urging said holding member in a longitudinal direction of said movable portion;

wherein at least a part of each of said plurality of direct-drive-type actuators is disposed in a corresponding opening formed in said holding member.

2. A lens driving mechanism according to claim 1, wherein said corresponding opening is formed by removing a portion of said holding member.

3. A lens driving mechanism according to claim 2, wherein said plurality of direct-drive-type actuators comprise a first direct-drive-type actuator and a second direct-drive-type actuator, a first movable portion of said first direct-drive-type actuator moving said holding member along a first axis parallel to said longitudinal direction of said first movable portion, a second movable portion of said second direct-drive-type actuator moving said holding member along a second axis parallel to said longitudinal direction of said second movable portion, said first axis being perpendicular to said second axis.

4. A lens driving mechanism according to claim 3, wherein said corresponding opening includes:

a first recess and a second recess that comprise a first external surface having a first surface portion perpendicular to said plane, a second external surface perpendicularly contiguous to said first external surface, and a third external surface, having a second surface portion, perpendicularly contiguous to said second external surface, said first direct-drive-type actuator being disposed in said first recess and said second direct-drive-type actuator being disposed in said second recess.

5. A lens driving mechanism according to claim 3, wherein said corresponding opening comprises a through-hole that includes a first internal surface having a first surface portion and a second internal surface having a second surface portion, which are perpendicular to said first axis, a third internal surface having a third surface portion and a fourth internal surface having a fourth surface portion, which are perpendicular to said second axis, said first direct-drive-type actuator and said second direct-drive-type actuator being disposed in said through-hole.

6. A lens driving mechanism according to claim 4, wherein said at least one lens comprises a correction lens included in a telephoto optical system that corrects a tremble of a focused image.

7. A lens driving mechanism according to claim 5, wherein said at least one lens comprises a correction lens included in a telephoto optical system that corrects a tremble of a focused image, said correction lens and another said correction lens, operating in association with each other, being unitarily held by said holding member in binoculars.

8. A lens driving mechanism according to claim 7, wherein said though-hole is formed between said correction lens and said another said correction lens.

9. A lens driving mechanism according to claim 8, wherein, when said holding member is in a standard position, a center of mass of said first direct-drive-type actuator and a center of mass of said second direct-drive-type actuator lie on an axis parallel to an optical axis of said correction lens.

10. A lens driving mechanism according to claim 4, wherein a projecting end-face of said first movable portion of said first direct-drive-type actuator slidably contacts at least one of said first surface portion and said second surface portion of said first recess, and a projecting end-face of said second movable portion of said second direct-drive-type actuator slidably contacts at least one of said first surface portion and said second surface portion of said second recess.

11. A lens driving mechanism according to claim 5, wherein a projecting end-face of said first movable portion of said first direct-drive-type actuator slidably contacts at least one of said first surface portion and said second surface portion, and a projecting end-face of said second movable portion of said second direct-drive-type actuator slidably contacts at least one of said third surface portion and said fourth surface portion.

12. A lens driving mechanism according to claim 10, further comprises an urging member that urges said holding member such that said projecting end-face of said first movable portion of said first direct-drive-type actuator slidably contacts said first surface portion of said first recess, and said projecting end-face of said second movable portion of said second direct-drive-type actuator slidably contacts said first surface portion of said second recess.

13. A lens driving mechanism according to claim 11, further comprises an urging member that urges said holding member such that said projecting end-face of said first movable portion of said first direct-drive-type actuator slidably contacts said first surface portion, and said projecting end-face of said second movable portion of said second direct-drive-type actuator slidably contacts said third surface portion.

14. A lens driving mechanism comprising:
a holding member that holds at least one lens; and a plurality of direct-drive-type actuators that drive said holding member in a plane perpendicular to an optical axis of said lens, each of said plurality of direct-drive-type actuators includes a movable portion in direct contact with a surface portion of said holding member, said movable portion urging said holding member in a longitudinal direction of said movable portion;
wherein a part of said holding member corresponding to one of said plurality of direct-drive-type actuators is defined by a first surface in said longitudinal direction and second surfaces contiguous to said first surface, at least one of said second surfaces being in slidable contact with a projecting end-face of said movable portion.

15. A lens driving mechanism comprises:
a holding member that holds at least one lens;
a first driving member that moves said holding member along a first axis in a plane perpendicular to an optical axis of said at least one lens; and
a second driving member that moves said holding member along a second axis perpendicular to said first axis in said plane;
wherein said first driving member and said second driving member are arranged along an axis parallel to said optical axis of said at least one lens.

16. A lens driving mechanism according to claim 15, wherein said holding member is provide with a casing, in which a first yoke is disposed, said first driving member and said second driving member are disposed such that said casing lies between said first driving member and said second driving member.

17. A lens driving mechanism according to claim 16, wherein a through-hole is formed in the casing, and said first yoke is disposed in said through-hole.

18. A lens driving mechanism according to claim 17, wherein said first driving member includes a first coil, a first magnet, a second magnet, said first yoke, and a second yoke; and
said second driving member includes a second coil, a third magnet, a fourth magnet, said first yoke, and a third yoke;
wherein said first coil and said second coil are provided on said holding member.

19. A lens driving mechanism according to claim 18, wherein said first coil is disposed on said holding member adjacent to a first surface of said first yoke, said first magnet and said second magnet are disposed on a first surface of said second yoke, and said first yoke is parallel to said second yoke; and
said second coil is disposed on said holding member adjacent to a second surface of said first yoke, said third magnet and said fourth magnet are disposed on a first surface of said third yoke, and said first yoke is parallel to said third yoke.

20. A lens driving mechanism according to claim 18, wherein said holding member is a plate disposed in a same plane as said first yoke.

21. A lens driving mechanism according to claim 20, wherein said first yoke is disposed between said first coil and said second coil.

22. A lens driving mechanism according to claim 21, wherein said first coil and said second coil are flat coils, leading wires of said flat coils being rotated around said axis parallel to said optical axis, and a width of said flat coils along said axis being less than a diameter of said flat coils along a plane perpendicular to said parallel axis.

23. A lens driving mechanism according to claim 22, wherein said first magnet and said second magnet are disposed between said first coil and said second yoke, and said third magnet and said fourth magnet are disposed between said second coil and said third yoke.

24. A lens driving mechanism according to claim 23, wherein said first magnet and said second magnet are plate magnets, longitudinal directions of said plate magnets crossing said first axis at right angles, and said third magnet and said fourth magnet are plate magnets, longitudinal directions of said plate magnets crossing said second axis at right angles.

25. A lens driving mechanism according to claim 15, wherein said holding member holds a pair of said at least one lens.

26. A lens driving mechanism according to claim 25, wherein said first driving member and said second driving member are disposed between said pair of at least one lens.

27. A lens driving mechanism according to claim 15, wherein said at least one lens is a correction lens correcting a trembling of a focused image.

28. A lens driving mechanism comprising:
a holding member that holds at least one lens, and a portion of a plane perpendicular to an optical axis of said at least one lens;
a first driving mechanism that moves said holding member along a first axis perpendicular to said optical axis; and
a second driving mechanism that moves said holding member along a second axis perpendicular to said first axis, said first driving mechanism and said second driving mechanism sharing a yoke to move said holding member along the first axis and the second axis;
wherein said first driving mechanism and said second driving mechanism are disposed symmetrically about said plane perpendicular to said optical axis.

29. A lens driving mechanism according to claim 28, further comprises a pedestal plate, provided on said holding member, that projects along said plane perpendicular to said optical axis, and includes an opening;
wherein said first driving mechanism comprises:
said yoke disposed in said opening;
a first coil formed on a first plane of said pedestal plate which is perpendicular to said optical axis;
a first magnet facing said first coil, and a second yoke supporting said first magnet; and
said second driving mechanism comprises:
said yoke;
a second coil formed on a second plane of said pedestal plate which is perpendicular to said optical axis and parallel to said first plane of said pedestal plate;
a second magnet facing said second coil, and a third yoke supporting said second magnet.

30. A lens driving mechanism according to claim 28, wherein said lens is a correction lens correcting a trembling of a focused image.

* * * * *